(12) United States Patent
Hanks et al.

(10) Patent No.: US 10,406,793 B2
(45) Date of Patent: Sep. 10, 2019

(54) HIGH-HERMETICITY DUAL OVENABLE FOOD PACKAGING FILM

(71) Applicant: TORAY PLASTICS (AMERICA), INC., N. Kingstown, RI (US)

(72) Inventors: Adam L. Hanks, Wakefield, RI (US); Joshua R. Cloutier, Exeter, RI (US); Patrick Alexander Murphy, Chicago, IL (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 284 days.

(21) Appl. No.: 15/476,608

(22) Filed: Mar. 31, 2017

(65) Prior Publication Data

US 2018/0281367 A1   Oct. 4, 2018

(51) Int. Cl.

| | | |
|---|---|---|
| *B32B 7/12* | (2006.01) | |
| *B32B 27/32* | (2006.01) | |
| *B32B 27/36* | (2006.01) | |
| *B29C 48/21* | (2019.01) | |
| *B29C 48/00* | (2019.01) | |
| *B29C 48/154* | (2019.01) | |
| *B29C 48/23* | (2019.01) | |
| *B29K 23/00* | (2006.01) | |
| *B29K 67/00* | (2006.01) | |
| *B29L 31/00* | (2006.01) | |
| *B29L 7/00* | (2006.01) | |
| *B29L 9/00* | (2006.01) | |
| *B05D 1/26* | (2006.01) | |

(52) U.S. Cl.
CPC ............ *B32B 27/32* (2013.01); *B29C 48/022* (2019.02); *B29C 48/154* (2019.02); *B29C 48/21* (2019.02); *B29C 48/23* (2019.02); *B32B 27/36* (2013.01); *B05D 1/265* (2013.01); *B29K 2023/0633* (2013.01); *B29K 2023/12* (2013.01); *B29K 2067/003* (2013.01); *B29L 2007/008* (2013.01); *B29L 2009/005* (2013.01); *B29L 2031/712* (2013.01); *B32B 2307/31* (2013.01); *B32B 2323/046* (2013.01); *B32B 2323/10* (2013.01); *B32B 2553/00* (2013.01)

(58) Field of Classification Search
None
See application file for complete search history.

(56) References Cited

U.S. PATENT DOCUMENTS

| | | | | |
|---|---|---|---|---|
| 5,888,648 | A * | 3/1999 | Donovan ................ | B32B 7/06 428/349 |
| 2002/0155267 | A1* | 10/2002 | Bader .................... | B32B 27/32 428/216 |
| 2004/0081842 | A1* | 4/2004 | Peet ....................... | B32B 27/08 428/515 |
| 2008/0145670 | A1* | 6/2008 | Song ...................... | B32B 27/32 428/420 |

* cited by examiner

*Primary Examiner* — Anish P Desai

(74) *Attorney, Agent, or Firm* — Morrison & Foerster LLP

(57) ABSTRACT

Disclosed herein are dual ovenable, high-hermecticity sealable films for packaging uses, such as form-fill-and-seal packages (e.g., bags). The films disclosed herein can have hermetic seal characteristics and hot tack strength at elevated temperatures for cooking and/or reheating operations. The films disclosed herein can be made comprising a heat stable base layer (e.g., a cast, monoaxially oriented, or biaxially oriented polypropylene, polyester, or polyamide film); a heat sealable layer; and/or a lap sealable layer.

58 Claims, 13 Drawing Sheets

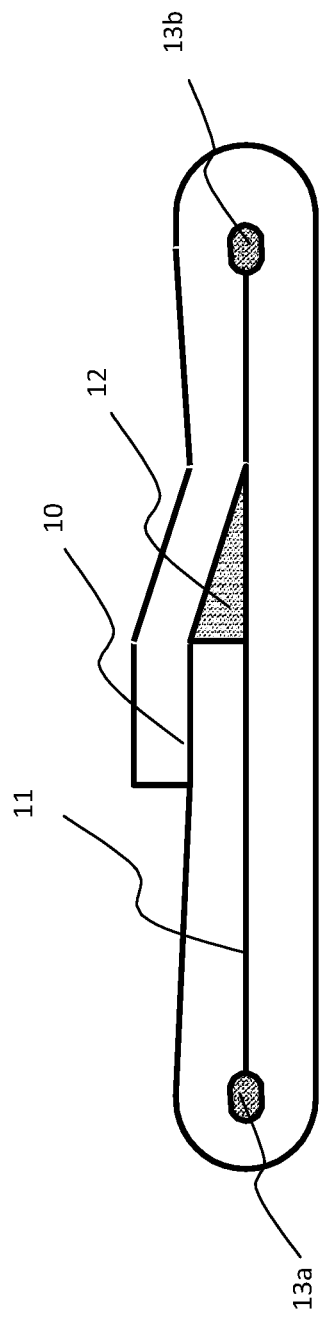
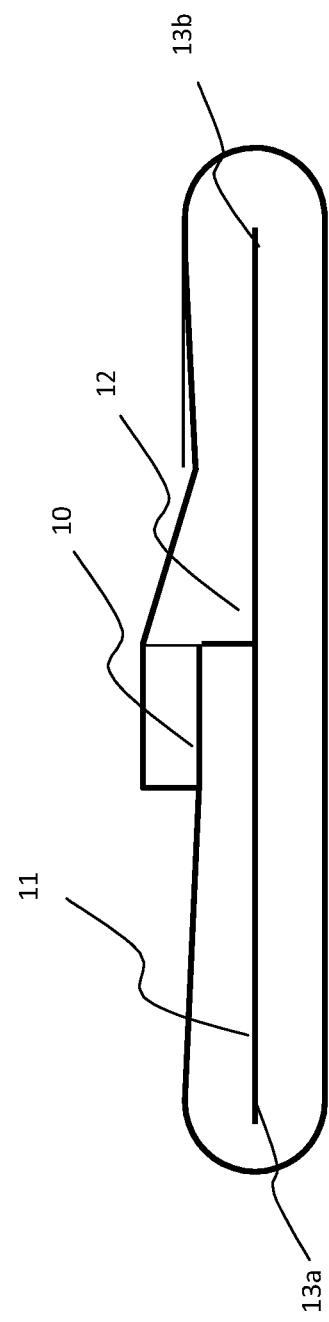

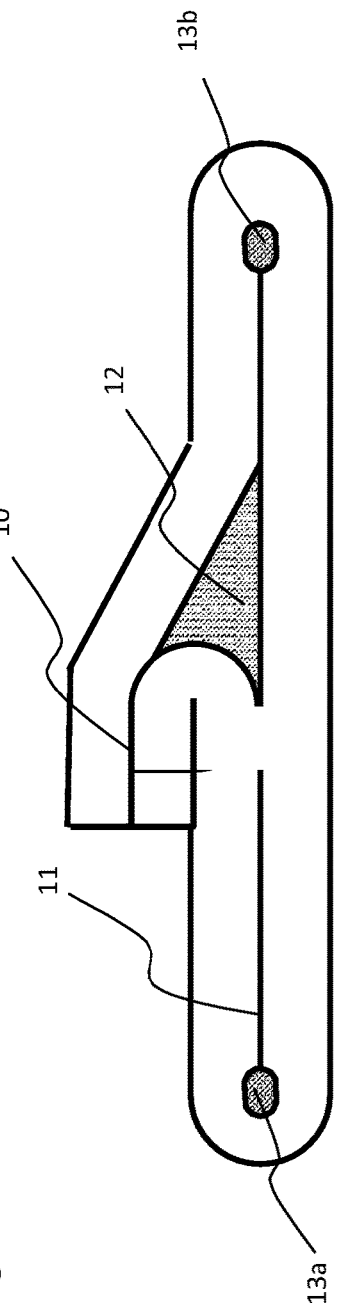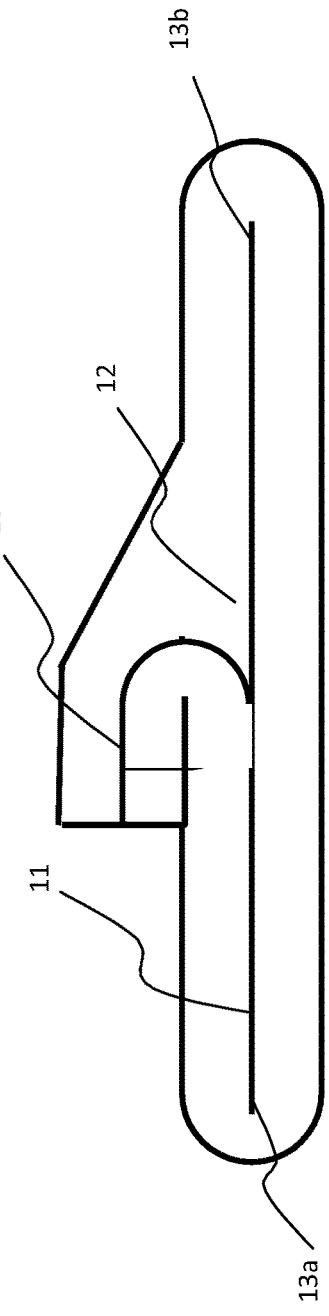

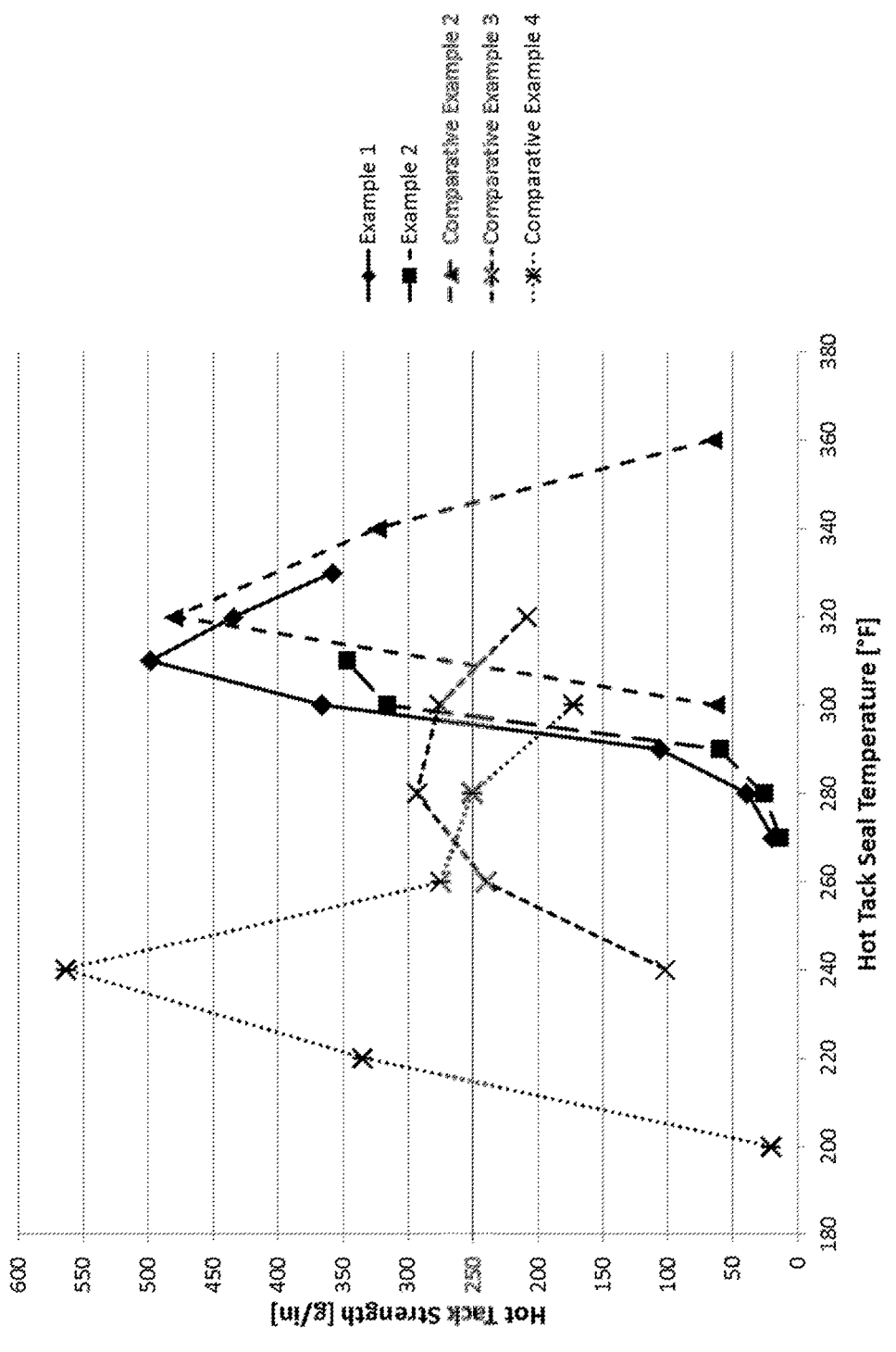

HIGH-HERMETICITY DUAL OVENABLE FOOD PACKAGING FILM

FIELD OF THE DISCLOSURE

This disclosure relates to films for form-fill-and-seal (FFS) food packaging. More particularly, this disclosure relates to high-hermecticity dual ovenable food packaging films.

BACKGROUND

Food producers increasingly offer portioned, prepared foods for their customers' convenience. In these food products, the food can be already prepared, mixed, and seasoned. In some instances, the food is already cooked, leaving the customer to reheat only (if desired). In other cases, the food is provided raw and is cooked by the customer. By moving food preparation from the serving location to a centralized supplier, the customers can achieve better consistency across locations, improved efficiencies of labor and material, and reduced costs. For the food producer, higher profits can be achieved by offering value-added products.

One challenge in providing food in such a manner is the packaging of the food. There are many factors that influence the packaging format and the requirements of the materials used to form that packaging. Some of these requirements are temperatures and pressures seen by the packaging in processing, distribution, and end use; weight, type, and nature of the product; secondary packaging style; marketing considerations such as display surface and consumer perception; costs of both material and processing/packing operations; and regulatory compliance.

For example, prepared single-serve meals are typically sold in rigid trays with a lid (either rigid or flexible) for ease of consumer use in reheating, serving, and eating since the rigid tray can act as both a cooking/reheating vessel and a plate. Material selection for the tray and lid can often be determined by the processing and cooking/reheating requirements. Crystallized polyethylene terephthalate trays (CPET) are commonly used for dual ovenable packages as it can withstand the heat of a conventional or convection oven and irradiation in a microwave oven. Polypropylene (PP) is commonly used for microwave only applications as it is lower cost than CPET and can hold up to microwave irradiation, but not to conventional or convection oven heat. Other common packaging materials such as high density polyethylene (HDPE), polystyrene (PS), high impact polystyrene (HIPS), and amorphous polyesters (e.g. amorphous polyethylene terephthalate (APET); polyethylene terephthalate-glycol modified (PETG); and others, including blends thereof) are not commonly used in cooking or reheating applications due to fitness-for-use and/or regulatory requirements.

Larger format family-size products can be found in a larger variety of packaging formats such as large trays for items like lasagna or form-fill-and-seal (FFS) bags for items like vegetables, french fries, or tater tots. For institutional packaging used in commercial kitchens, the marketing considerations and requirements are simpler, but the cost requirements become more important. For this reason, simpler and quicker operations like FFS bags are often preferred over rigid tray filling and lidding.

Packaging high-moisture content foods and liquids present additional challenges over packaging dry foods in FFS operations, namely in the areas of seal-through-contamination, hot fill, and hermeticity. Some dry foods packaged in FFS (e.g., powders and powder-coated cereals and snacks) can present challenges to seal-through-contamination. However, with liquids, this challenge is even more demanding. With regard to solid foods, the dust and fines limit the effective seal area by blocking the contact between the two sealant surfaces in discrete locations. For liquids, the contamination is instead a thin film spread over the full area of the seal. In some packaging operations, the food can be pasteurized and put in the package while still hot, in a process called "hot fill." In these cases, the hot tack properties of the sealant can be critical as the fresh seal should maintain its integrity while at an elevated temperature and cooling slowly. Hot tack can also be a critical property for cooking and reheating applications, where internal pressure can build and apply stress on the seals.

An additional challenge to packaging foods and liquids can be hermeticity. When packaging dry foods, hermeticity can be important for shelf life as the food should be protected from oxygen or moisture vapor transmission. However, there is usually a certain level of transmission through incomplete seals or channel leaks in package corners (cross section shown in FIGS. 1b, 1c, 2b, and 2c) or around the center seal area (also called the back seal area or lap seal area in lap seal packages (cross section shown in FIGS. 1b and 1c); or T-zone, fold over seal area, or fin seal area in fin seal packages (cross section shown in FIGS. 2b and 2c)). These very small leaks do not allow any solid product to escape or contamination to enter, but oxygen, moisture vapor, and aromas can diffuse through these channels. For high-moisture content foods and liquid packaging, these minute leaks are unacceptable containment failures. In addition, product can leak out through these channels leading to underweight packages, possibly spoiled product, and possibly damaged secondary packaging.

To understand these obstacles to hermeticity, the forming process must first be understood. The film can be shaped into a tube on a forming collar by bringing the edges of the film together. There are two ways these ends can be joined. The first way is by lap sealing in which the film is first formed into a tube (FIG. 1A) and lap sealed. The end seal is then formed by flattening the package and heat sealing the entire width of the package. A cross section of this is shown in FIGS. 1A-C, where item 10 is the lap seal and item 11 is the inside of the package tube where the product will be filled. In a package formed this way, the most common places for hermetic failures are at the end seal in the corners and the area adjacent to the lap seal. A cross section of a non-hermetic end seal is shown in FIG. 1B, and a hermetic end seal is shown in FIG. 1B. In both figures, item 10 is the lap seal, item 11 is the end seal where the tube has been flattened, item 12 is the area adjacent to the lap seal that is open in FIG. 1B and closed in FIG. 1C, and items 13a and 13b are the corners. These corner failures are typically the result of the restorative spring force caused by the tight folding of the film.

The second way the ends can be joined is a fin or fold-over seal. The film is first formed into a tube (FIG. 2A) and the fin or fold-over seal is made. The end seal is then formed by flattening the package and heat sealing the entire width of the package. A cross section of this is shown in FIGS. 2A-C, where item 10 is the fin or fold-over seal and item 11 is the inside of the tube where the product will be filled. In a package formed this way, the most common places for hermetic failures are at the end seal in the corners and the area adjacent to the fin or fold-over seal. A cross section of a non-hermetic end seal is shown in FIG. 2B, and a hermetic end seal is shown in FIG. 2C. In both figures, item 10 is the fin or fold-over seal, item 11 is the end seal where the tube has been flattened, item 12 is the area adjacent to the lap seal that is open in FIG. 2B and closed in FIG. 2C, and items 13a and 13b are the corners. These corner failures are typically the result of the restorative spring force caused by the tight folding of the film.

SUMMARY

Products currently on the marketplace for liquid packaging address the above issues by using thick sealant layers as part of a thick blown or cast film, typically with a five-layer coextruded structure. However, the additional material required to create these thicker sealant layers can be expensive. Applicants have discovered thinner structures that meet regulatory compliance for high temperature use (e.g., Conditions of Use A through H as defined in Table 2 of 21 CFR 176.170).

Disclosed herein are dual ovenable, high-hermeticity sealable films for packaging uses, such as form-fill-and-seal packages (e.g., bags). The films disclosed herein can have hermetic seal characteristics and hot tack strength at elevated temperatures for cooking and/or reheating operations. The films disclosed herein can be for packages for liquid and high moisture content foods that are cooked and/or reheated in a conventional, convection, or microwave oven after packaging. Applicants discovered that such a film can be made comprising a heat stable base layer (e.g., a cast, monoaxially oriented, or biaxially oriented polypropylene, polyester, or polyamide film); a heat sealable layer; and/or a lap sealable layer by coextrusion and/or extrusion coating.

In some embodiments, a film includes a heat stable layer and a heat sealable layer on a side of the heat stable layer, wherein the heat sealable layer includes a first heat sealable layer including 60-80 wt % metallocene-catalyzed polypropylene and 20-40 wt % low density polyethylene (LDPE), a second heat sealable layer on a side of the first heat sealable layer opposite the heat stable layer including 60-80 wt % metallocene-catalyzed polypropylene and 20-40 wt % low density polyethylene (LDPE), and a third heat sealable layer on a side of the second heat sealable layer opposite the first heat sealable layer including 75-95 wt % metallocene-catalyzed polypropylene and 5-25 wt % propylene-butylene copolymer. In some embodiments, the film includes a lap sealable layer on a side of the heat stable layer opposite the heat sealable layer. In some embodiments, the lap sealable layer includes a first lap sealable layer including 60-80 wt % metallocene-catalyzed polypropylene and 20-40 wt % LDPE and a second lap sealable layer on a side of the first lap sealable layer opposite the heat stable layer including 80-100 wt % metallocene-catalyzed polypropylene and 0-20 wt % propylene-butylene copolymer. In some embodiments, the second lap sealable layer includes 80-95 wt % metallocene-catalyzed polypropylene and 5-20 wt % propylene-butylene. In some embodiments, the second lap sealable layer consists of metallocene-catalyzed polypropylene. In some embodiments, the film includes a primer layer between the heat stable layer and the heat sealable layer. In some embodiments, the film includes a primer layer between the heat stable layer and the lap sealable layer. In some embodiments, the heat stable layer includes a core layer including crystalline PET and a skin layer on a side of the core layer opposite the heat sealable layer including amorphous copolyester. In some embodiments, the heat stable layer includes a core layer including propylene homopolymer and a skin layer on a side of the core layer opposite the heat sealable layer including random copolymer of propylene and ethylene.

In some embodiments, a film includes a heat stable layer; a heat sealable layer on a side of the heat stable layer, wherein the heat sealable layer includes a first heat sealable layer including 60-80 wt % metallocene-catalyzed polypropylene and 20-40 wt % low density polyethylene (LDPE), a second heat sealable layer on a side of the first heat sealable layer opposite the heat stable layer including 60-80 wt % metallocene-catalyzed polypropylene and 20-40 wt % low density polyethylene (LDPE), a third heat sealable layer on a side of the second heat sealable layer opposite the first heat sealable layer including 75-95 wt % metallocene-catalyzed polypropylene and 5-25 wt % propylene-butylene copolymer; and a lap sealable layer on a side of the heat stable layer opposite the heat sealable layer, wherein the lap sealable layer includes a first lap sealable layer including 60-80 wt % metallocene-catalyzed polypropylene and 20-40 wt % LDPE and a second lap sealable layer on a side of the first lap sealable layer opposite the heat stable layer including 80-100 wt % metallocene-catalyzed polypropylene and 0-20 wt % propylene-butylene copolymer. In some embodiments, the second lap sealable layer includes 80-95 wt % metallocene-catalyzed polypropylene and 5-20 wt % propylene-butylene. In some embodiments, the second lap sealable layer consists of metallocene-catalyzed polypropylene. In some embodiments, the film includes a first primer layer between the heat stable layer and the heat sealable layer and a second primer layer between the heat stable layer and the lap sealable layer. In some embodiments, the heat stable layer includes a core layer including crystalline PET and a skin layer on a side of the core layer opposite the heat sealable layer including amorphous copolyester. In some embodiments, the heat stable layer includes a core layer including propylene homopolymer and a skin layer on a side of the core layer opposite the heat sealable layer including random copolymer of propylene and ethylene.

In some embodiments, a method of forming a film includes extruding a heat stable layer; and extrusion coating a heat sealable layer on a side of the heat stable layer, wherein the heat sealable layer includes a first heat sealable layer including 60-80 wt % metallocene-catalyzed polypropylene and 20-40 wt % low density polyethylene (LDPE), a second heat sealable layer on a side of the first heat sealable layer opposite the heat stable layer including 60-80 wt % metallocene-catalyzed polypropylene and 20-40 wt % low density polyethylene (LDPE), and a third heat sealable layer on a side of the second heat sealable layer opposite the first heat sealable layer including 75-95 wt % metallocene-catalyzed polypropylene and 5-25 wt % propylene-butylene copolymer. In some embodiments, the method includes extrusion coating a lap sealable layer on a side of the heat stable layer opposite the heat sealable layer. In some embodiments, the lap sealable layer includes a first lap sealable layer including 60-80 wt % metallocene-catalyzed polypropylene and 20-40 wt % LDPE and a second lap sealable layer on a side of the first lap sealable layer opposite the heat stable layer including 80-100 wt % metallocene-catalyzed polypropylene and 0-20 wt % propylene-butylene copolymer. In some embodiments, the second lap sealable layer includes 80-95 wt % metallocene-catalyzed polypropylene and 5-20 wt % propylene-butylene. In some embodiments, the second lap sealable layer consists of metallocene-catalyzed polypropylene. In some embodiments, the method includes solution coating a first primer layer on a side of the heat stable layer such that the first primer layer is between the heat stable layer and the heat sealable layer. In some embodiments, the method includes solution coating a second primer layer on a side of the heat stable layer such that the second primer layer is between the heat stable layer and the lap sealable layer. In some embodiments, the method includes coextruding a core layer including crystalline PET and a skin layer including amorphous copolyester to form the heat stable layer. In some embodiments, the heat sealable layer is extrusion coated on a side of the core layer opposite the skin layer. In some embodiments, the method includes coextruding a core layer including propylene homopolymer and a skin layer including random copolymer of propylene and ethylene. In some embodiments, the heat sealable layer is extrusion coated on a side of the core layer opposite the skin layer.

In some embodiments, a method of forming a film includes extruding a heat stable layer; extrusion coating a heat sealable layer on a side of the heat stable layer, wherein the heat sealable layer includes a first heat sealable layer including 60-80 wt % metallocene-catalyzed polypropylene and 20-40 wt % low density polyethylene (LDPE), a second heat sealable layer on a side of the first heat sealable layer opposite the heat stable layer including 60-80 wt % metallocene-catalyzed polypropylene and 20-40 wt % low density polyethylene (LDPE), and a third heat sealable layer on a side of the second heat sealable layer opposite the first heat sealable layer including 75-95 wt % metallocene-catalyzed polypropylene and 5-25 wt % propylene-butylene copolymer; extrusion coating lap sealable layer on a side of the heat stable layer opposite the heat sealable layer, wherein the lap sealable layer includes a first lap sealable layer including 60-80 wt % metallocene-catalyzed polypropylene and 20-40 wt % LDPE and a second lap sealable layer on a side of the first lap sealable layer opposite the heat stable layer including 80-100 wt % metallocene-catalyzed polypropylene and 0-20 wt % propylene-butylene copolymer. In some embodiments, the second lap sealable layer includes 80-95 wt % metallocene-catalyzed polypropylene and 5-20 wt % propylene-butylene. In some embodiments, the second lap sealable layer consists of metallocene-catalyzed polypropylene. In some embodiments, the method includes solution coating a first primer layer on a side of the heat stable layer such that the first primer layer is between the heat stable layer and the heat sealable layer and solution coating a second primer layer on a side of the heat stable layer opposite the first primer layer such that the second primer layer is between the heat stable layer and the lap sealable layer. In some embodiments, the method includes coextruding a core layer including crystalline PET and a skin layer including amorphous copolyester to form the heat stable layer. In some embodiments, the heat sealable layer is extrusion coated on a side of the core layer opposite the skin layer. In some embodiments, the method includes coextruding a core layer including propylene homopolymer and a skin layer including random copolymer of propylene and ethylene. In some embodiments, the heat sealable layer is extrusion coated on a side of the core layer opposite the skin layer.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that the layer has at least about 80 wt %, about 90 wt %, or about 95 wt % LDPE, is meant to mean that the weight percentage of LDPE in the layer can be at least about 80 wt %, at least about 90 wt %, or at least about 95 wt %.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which:

FIG. 1B illustrates an example of a cross section of a non-hermetic end lap seal.

FIG. 1C illustrates an example of a cross section of a hermetic end lap seal.

FIG. 2B illustrates an example of a cross section of non-hermetic end fin seal.

FIG. 2C illustrates an example of a cross section of a hermetic end fin seal.

FIG. 11 illustrates hot tack strengths of some of the examples and comparative examples tested according to ASTM F-1921 method B with a 0.0 s cool delay.

In the Figures, like reference numbers correspond to like components unless otherwise stated.

DETAILED DESCRIPTION

Figure 1A:
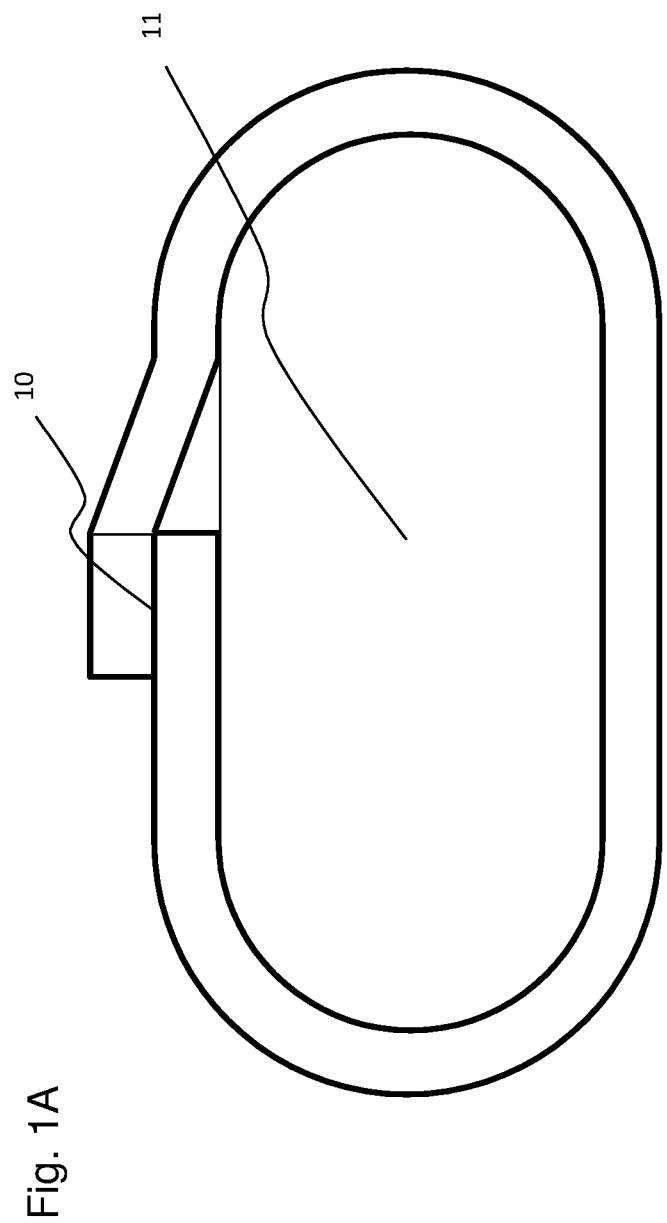
FIG. 1A illustrates an example of a cross section of lap sealing in which the sealant layer inside of the film tube is sealed to the outside of the film tube.

Disclosed herein are dual ovenable, high-hermeticity sealable films for packaging uses, such as form-fill-and-seal packages (e.g., bags) that meet regulatory compliance for high temperature use (e.g., Conditions of Use A through H as defined in Table 2 of 21 CFR 176.170). The films disclosed herein can have hermetic seal characteristics and hot tack strength at elevated temperatures for cooking and/or reheating operations. The films disclosed herein can be for packages for liquid and high moisture content foods that are cooked and/or reheated in a conventional, convection, or microwave oven after packaging. Applicants discovered that such a film can be made comprising a heat stable base layer (e.g., a cast, monoaxially oriented, or biaxially oriented polypropylene, polyester, or polyamide film); a heat sealable layer; and/or a lap sealable layer by coextrusion and/or extrusion coating.

In order to contain the liquid or high moisture content food, a hermetic seal is often needed. Seal hermeticity can be determined by leak testing in any of various methods including leak testing in a dunk tank (e.g. ASTM D3078) or by internal pressurization (e.g. ASTM F1140). In some embodiments, the films disclosed herein do not have leaks at about 15 inHg vacuum, at about 20 inHg vacuum, or at greater than 25 inHg vacuum measured according to ASTM D3078. In some embodiments, the films disclosed herein do not have flow at about 15 inHg vacuum, at about 20 inHg vacuum, or at greater than 25 inHg vacuum measured according to ASTM F1140. To form a hermetic seal within a reasonable amount of time (determined by the business considerations of the packaging operation), the sealant should have sufficient flow to close all gaps in the seal area. These gaps can occur due to wrinkles through the seal area, in the corners of the package (FIGS. 1b and 2b, items 13a and 13b), or around the center seal area (also called the back seal area or lap seal area in lap seal packages (FIG. 1b, item 12); or T-zone, fold over seal area, or fin seal area in fin seal packages (FIG. 2b, item 12)).

There are many causes for the wrinkles including film thickness variations, such as mechanical misalignments in the packaging machine, and uneven tensions as a result of suboptimal settings in the packaging machine drives.

The possible gaps in the corners of the package (FIGS. 1B and 2B, items 13a and 13b) can come from the restorative spring force inherent in most thermoplastic films. When materials with shape memory or poor dead fold properties are forced into a new shape, the internal stress created by the forming action can translate into a restorative force. The sealant should have sufficient thickness to fill the volume enclosed in the seal area as defined by the minimum bend radius of the composite film. A sealant with sufficient flow under the sealing conditions can conform to the new shape of the film and caulk this gap. The thickness and conformability of the sealant interact, as a thicker sealant layer can compensate for a less conformable sealant material and conversely, a more conformable sealant material can allow for a thinner sealant layer.

This same interaction is true in the center seal area where the end seal and back seal of a pouch meet, in which gaps can be formed due to the increased package thickness from the many overlapped layers. In a lap seal package (FIG. 1), there can be two layers on either side of the center seal area (the front and back of the bag) and three layers in the center seal area (the front and both parts of the back of the bag). In a fin or fold-over seal package (FIG. 2), there can be two layers on either side of the center seal area as in a lap seal package, but four layers in the T-zone (the front and back of the bag, plus the left and right sides of the fin). This increased thickness can cause a higher pressure during sealing in that area, and lower pressure to either side of the thicker section. If the sealant has insufficient thickness for its conformability, these areas may not seal, leaving unacceptable leaks in the package.

Figure 2A:
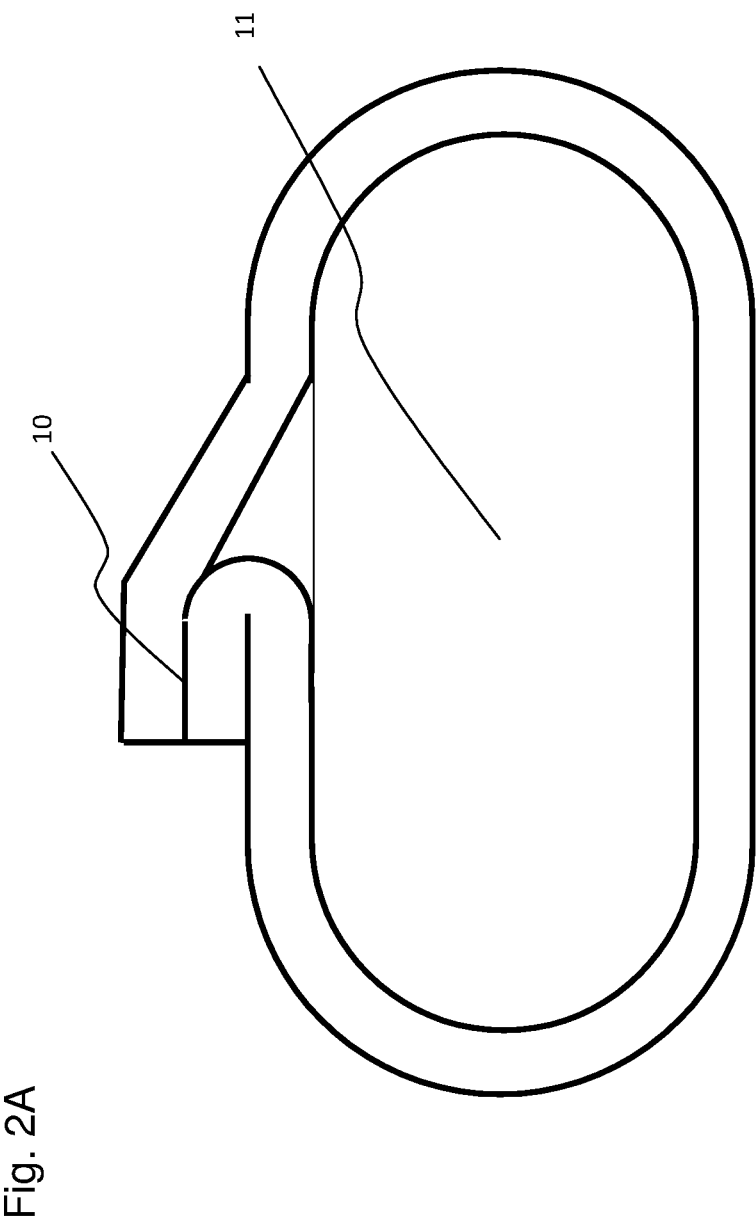
FIG. 2A illustrates an example of a cross section of fin or fold-over sealing in which the sealant inside of the film tube is sealed to itself, leaving a fin folded over on the back of the package.
Figure 3:
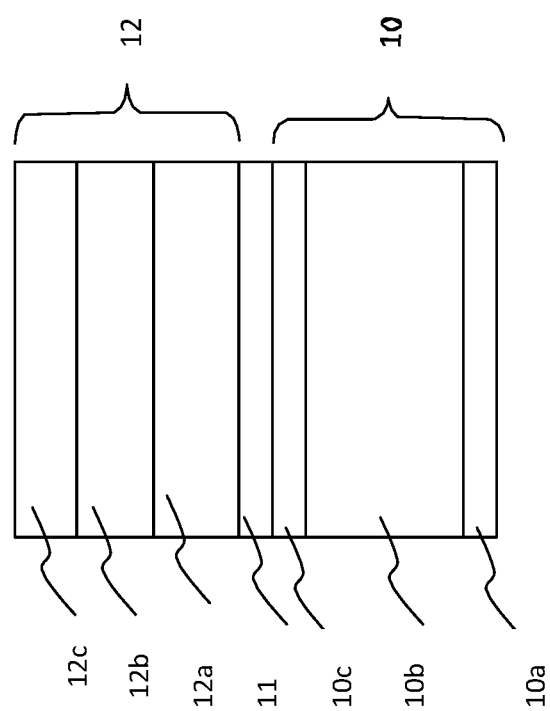
FIG. 3 illustrates an example of a first embodiment of a sealable film disclosed herein.
Figure 4:
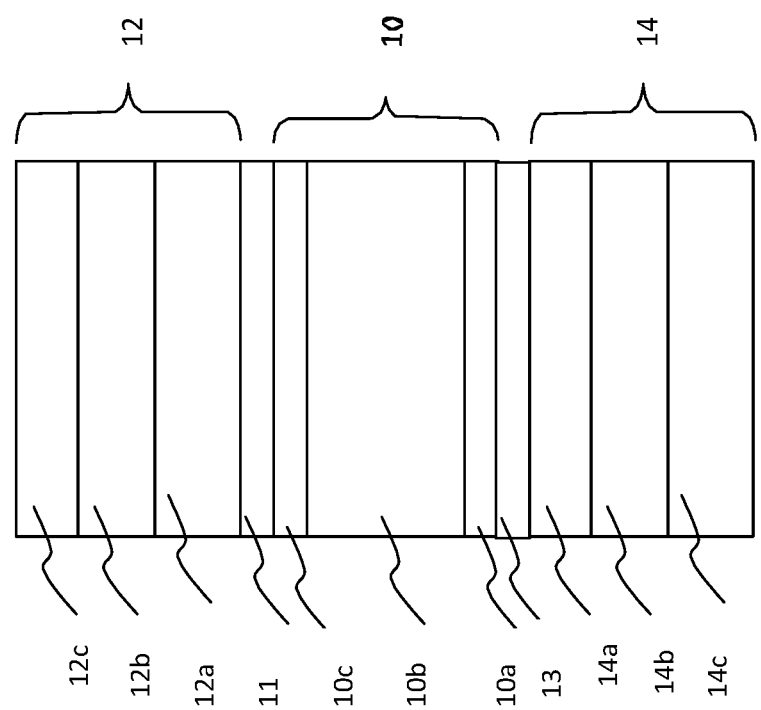
FIG. 4 illustrates an example of a second embodiment of a sealable film disclosed herein.

A second sealant property that is important for good package formation, can be hot tack. This can be important for hermeticity in the corners of the package because if there is not enough hot tack strength, the restorative spring force caused by the forming of the package can open the seal in the tight radius corner (FIGS. 1B and 2B, items 13a and 13b). Hot tack can be defined as the ability of a sealant to hold while still warm or semi-molten. It can be tested according to the ASTM Test Method F1921. In some embodiments, the films disclosed herein can have a hot tack greater than about 200 g/in, about 250 g/in, or about 300 g/in between 300-350° F. Hot tack is a property influenced by many factors including intrinsic sealant material properties such as thermal properties (softening point, melting peak, melting onset, crystallization rate, enthalpy of fusion, etc) and chemistry (polarity, chain branching, intermolecular forces, etc); and film properties such as layer thickness, elasticity, crystallinity, etc. Hot tack can also be an important property for the filling and cooking/reheating operations. For filling to run quickly, food product should be put into the package while the seal is still warm or incompletely solidified. Waiting for the seal to cool down can slow down the packaging operation too much to be economically viable. The hot tack strength of the film should be sufficient to maintain the hermetic seal while supporting the weight of the product. Hot tack at the cooking and/or reheating conditions can also be critical because even if a good package can be formed upon filling, if the package opens during the cooking or reheating operation, the product can be lost or damaged.

FIGS. 3-10 provide examples of embodiments of a sealable film disclosed herein. The sealable films disclosed herein can be used for form-fill-and-seal (FFS) food packaging (e.g., bags) for use in both microwave and convention ovens. In addition, the sealable films disclosed herein can contain high liquid content food that is packed raw and cooked within the package. The sealable film can include at least a heat stable layer (10) and a heat-sealable layer (12). In some embodiments, the heat sealable layer can be on a side of the heat stable layer.

The heat stable layer can have sufficient mechanical properties and stability to provide the necessary stiffness, resilience, and strength for the packaging, cooking, and/or reheating operations plus any shipping, distribution, or other handling. The heat stable layer can include a polypropylene film and/or a polyester film. In some embodiments, the heat stable layer can be mono-axially oriented or biaxially oriented. In some embodiments, the heat stable layer can include polyester such as polyethylene terephthalate (PET) or any polymer or copolymer formed from the polycondensation of a diol (such as but not limited to ethylene glycol, propylene glycol, butylene glycol, and cyclohexanedimethanol) with a diacid (such as but not limited to terephthalic acid, isophthalic acid, naphthalic acid, and 2,6-naphtalenedicarboxylic acid). In some embodiments, the heat stable layer can include homopolymer polypropylene and/or random copolymer of propylene and ethylene. In some embodiments, the homopolymer polypropylene can have a peak melting temperature of 163° C. In some embodiments, the random copolymer of propylene and ethylene can have a peak melting temperature of 144° C.

In some embodiments, the heat stable layer can be a biaxially oriented polypropylene film (BOPP), a mono-axially oriented polypropylene film (MOPP), a cast nonoriented polypropylene film (CPP), a biaxially oriented polyester (polyetheylene terephthalate) film (BOPET), a biaxially oriented polyamide film (BOPA, nylon film), or any other substrate that provides sufficient mechanical properties, processability (coating, packaging, and cooking/reheating), and meets the FDA Conditions of Use regulations for the application.

The heat stable layer can also be heat stable at the conditions it will experience in the sealing, cooking, and reheating processes. To be heat stable, the film should not deform so much as to be unusable by or unappealing to the packer or customer. It is also preferable that the heat stable layer be more heat stable than the sealant material. This is so that the composite structure does not deform during the heat sealing portion of the packaging process. The peak melting temperature of the sealable films as determined by a differential scanning calorimetry (DSC) method (e.g. ASTM D-3418) can be used as an indicator of thermal stability. In some embodiments, the peak melting temperature of the films disclosed herein can be at least about 300° F., about 310° F., or about 320° F. In some embodiments, the peak melting temperature of the films disclosed herein can be at least about 430° F., about 450° F., or about 470° F. True thermal stability can also be a function of the processing of the materials, but for relative comparisons, the melting temperature is a useful predictor value.

In some embodiments, the heat stable layer can include at least two layers. In some embodiments, the heat stable layer is a monolayer that includes polyethylene terephthalate (PET), such as crystalline PET. In some embodiments, the heat stable layer has 2 or 3 layers. In some embodiments, the multiple layers of the heat stable layer can be coextruded layers. In some embodiments, the heat stable layer can include a core layer and/or a skin layer. For example, FIG. 5 includes core layer 10b and skin layer 10c. In some embodiments, the skin layer of the heat stable layer can be an amorphous polyester skin layer. In some embodiments, the core layer of the heat stable layer can be a crystalline polyester layer. In some embodiments, the core layer of the heat stable layer can include crystalline PET resin and/or homopolymer polypropylene. In some embodiments, the skin layer of the heat stable layer can include amorphous copolyester and/or random copolymer of propylene and ethylene. In some embodiments, the heat stable layer can include a lap seal receiving layer (10a). In some embodiments, the heat stable layer can include a core layer, a skin layer, and/or a lap seal receiving layer. In some embodiments, the heat stable layer can include multiple skin layers and/or multiple lap seal receiving layers. For example, the heat stable layer can have two skin layers or two lap seal receiving layers on opposite sides of the core layer. In some embodiments, the heat stable layer can include a core layer and a lap seal receiving layer. In some embodiments, the lap seal receiving layer can include amorphous copolyester and/or random copolymer of propylene and ethylene. In some embodiments, the lap seal receiving layer of the heat stable layer can be an amorphous polyester layer. The composition of the lap seal receiving layer can be the same as the compositions of the skin layer of the heat stable layer disclosed herein.

In some embodiments, the amorphous polyester or copolyester can include isophthalate modified copolyesters, sebacic acid modified copolyesters, diethyleneglycol modified copolyesters, triethyleneglycol modified copolyesters, and/or cyclohexanedimethanol modified copolyesters. In some embodiments, copolyesters in the amorphous polyester skin layer have a low melting or amorphous aromatic copolyester (such as one based on terephthalate/isophthalate copolymer with ethylene glycol or a copolyester made from a combination of terephthalic acid, ethylene glycol, and cyclohexyldimethanol).

Antiblock and/or slip additives can be added to the heat stable layer including any individual layer or multiple layers of the heat stable layer in an amount of about 0.01-0.5 wt %, about 0.03-0.4 wt %, or about 0.1-0.4 wt % the layer. Examples of antiblock and/or slip additives that may be used for polyester film applications can include amorphous silica particles with mean particle size diameters in the range of about 0.05-0.1 μm at concentrations of 0.1-0.4 wt % the film or layer; calcium carbonate particles with a medium particle size of 0.3-1.2 μm at concentrations of 0.03-0.2 wt % the film or layer; and precipitated alumina particles of sub-micron sizes with an average particle size of about 0.1 μm at concentrations of 0.1-0.4 wt % the film or layer. Additional examples include inorganic particles, aluminum oxide, magnesium oxide, titanium oxide, such complex oxides as kaolin, talc, and montmorillonite, such carbonates as calcium carbonate and barium carbonate, such sulfates as calcium sulfate and barium sulfate, such titanates as barium titanate and potassium titanate, and such phosphates as tribasic calcium phosphate, dibasic calcium phosphate, and monobasic calcium phosphate, or combinations thereof. Two or more of these may be used together to achieve a specific objective. As examples of organic particles, vinyl materials such as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene may be used or contemplated in the heat stable layer or layers of the heat stable layer. One way to incorporate the aforementioned antiblock particles can be via masterbatch addition. In such an embodiment, a high crystalline polyester layer can be produced by extruding a pellet-to-pellet mix of unfilled polyester pellet and masterbatch polyester pellet (additive concentrate).

The heat stable layer can be produced by melt extrusion (if monolayer) or co-extrusion (if comprised by two or more layers, e.g., core, skin, and lap seal receiving layers as described above). In addition, the heat stable layer can be stretched in one or two orthogonal directions, i.e., for mono- or biaxial orientation. This orientation process can provide greater strength for the heat stable, and thus also for the overall film. The orientation also can permit the film to be produced to a thinner cross-section dimension.

A heat-sealable layer can be applied to one side of the heat stable layer. In some embodiments, a heat-sealable layer can be applied to the skin layer, the core layer, and/or the lap seal receiving layer of the heat stable layer. The heat-sealable layer can be sufficiently thick and have sufficient flow during the sealing process to close the gaps in the seal area, thereby forming a hermetic seal that can contain high-liquid food products. In addition, the heat-sealable layer can impart sufficient hot tack properties to the film for it to survive the packing process—particularly hot fill—cooking and/or reheating processes.

In some embodiments, a primer layer can be applied to one side of the heat stable layer. In some embodiments, a primer layer can be applied to both sides of the heat stable layer. In some embodiments, a primer layer can be applied to the skin layer, the core layer, and/or the lap seal receiving layer of the heat stable layer. In some embodiments, the primer layer can be between the heat sealable layer and the heat stable layer. For example, the figures disclose primer layer 11 between heat sealable layer 12 and heat stable layer 10. In some embodiments, the primer layer can be added by a solution coating method, such as gravure roll coating. In some embodiments, the primer layer comprises polyethylenimine, ethylene acrylic acid copolymer, ethylene methyl acrylate, urethane, or combinations thereof. In some embodiments, the dry coat weight of the primer layer can be up to about 0.03 pounds per ream. In some embodiments, the dry coat weight of the primer layer can be about 0.005-0.02, about 0.0075-0.015, about 0.0075-0.0125, or about 0.01 pounds per ream. The primer layer can help ensure strong adhesion of the heat sealable layer to the heat stable layer. In some embodiments, the primer layer can be formed using MICA A-131-X or MICA H-760-A. In some embodiments, the heat sealable layer can be extrusion-coated on the primer layer or on the heat stable layer.

The heat sealable layer can be mono-layered or multi-layered. In some embodiments, the heat sealable layer can include 2-3 layers. In some embodiments, the heat sealable layer can include a bonding layer, a seal enhancing layer, and/or a heat sealable surface. The bonding and seal enhancing layer can act as a compressible layer to aid in the forming of a hermetic seal, and can be formulated to adhere to the primer layer and/or a lap seal receiving layer. The primer layer can be a thin coating layer applied to a BOPET film to promote the adhesion between the film and the bonding and seal enhancing layer and between the film and the bonding layer. The bonding layer can be formulated to adhere to the primer layer and the seal enhancing layer. The seal enhancing layer can act as a compressible and conformable layer to aid in the forming of a hermetic seal. Each of these sublayers can be extrusion-coated either individually or together on the primer layer or on the heat stable layer. In addition, each of these layers can be coextruded together with or without the heat stable layer. For example, some of the figures illustrate sublayers 12a, 12b, and 12c of heat sealable layer 12.

The first heat sealable sublayer can act as a bonding layer to the heat stable layer. In some embodiments, the first heat sealable layer can include metallocene-catalyzed polypropylene, low density polyethylene (LDPE), linear low density polyethylene (LLDPE), and/or polyethylene plastomer. In some embodiments, the first heat sealable sublayer can include about 40-100 wt %, about 50-95 wt %, about 60-80 wt %, about 65-75 wt %, about 68-72 wt %, or about 70 wt % metallocene-catalyzed polypropylene. In some embodiments, the first heat sealable sublayer can include about 0-60 wt %, about 5-50 wt %, about 20-40 wt %, about 25-35 wt %, about 28-32 wt %, or about 30 wt % LDPE. In some embodiments, the first heat sealable sublayer can include about 0-50 wt %, about 5-40 wt %, about 10-30 wt %, about 15-25 wt %, or about 20 wt % LDPE. In some embodiments, the first heat sealable sublayer can include at least about 70 wt %, about 80 wt %, about 90 wt %, about 95 wt %, or about 100 wt % LDPE. In some embodiments, the first heat sealable sublayer can include about 80-100 wt %, about 90-100 wt %, about 94-100 wt %, or about 95 wt % LLDPE. In some embodiments, the first heat sealable sublayer can include about 50-100 wt %, about 60-95 wt %, about 70-90 wt %, about 75-85 wt %, or about 80 wt % polyethylene plastomer.

In some embodiments, the first heat sealable sublayer can have a thickness of about 15-75 G, about 18-50 G, about 22-36 G, about 20-30, about 25-30 G, or about 28-30 G. In some embodiments, the first heat sealable sublayer can have a thickness of about 15-75 G, about 30-70 G, about 40-60 G, or about 36-56 G.

The second heat sealable sublayer can act as a seal enhancing layer. In some embodiments, the second heat sealable layer can have the same compositions as the first heat sealable layer described above. In some embodiments, the second heat sealable layer can include metallocene-catalyzed polypropylene, low density polyethylene (LDPE), linear low density polyethylene (LLDPE), ethylene acrylic acid copolymer, and/or polyethylene plastomer. In some embodiments, the second heat sealable sublayer can include about 40-100 wt %, about 50-95 wt %, about 60-80 wt %, about 65-75 wt %, about 68-72 wt %, or about 70 wt % metallocene-catalyzed polypropylene. In some embodiments, the second heat sealable sublayer can include about 0-60 wt %, about 5-50 wt %, about 20-40 wt %, about 25-35 wt %, about 28-32 wt %, or about 30 wt % LDPE. In some embodiments, the second heat sealable sublayer can include about 0-50 wt %, about 5-40 wt %, about 10-30 wt %, about 15-25 wt %, or about 20 wt % LDPE. In some embodiments, the second heat sealable sublayer can include at least about 70 wt %, about 80 wt %, about 90 wt %, about 95 wt %, or about 100 wt % LDPE. In some embodiments, the second heat sealable sublayer can include about 80-100 wt %, about 90-100 wt %, about 94-100 wt %, or about 95 wt % LLDPE. In some embodiments, the second heat sealable sublayer can include about 50-100 wt %, about 60-95 wt %, about 70-90 wt %, about 75-85 wt %, or about 80 wt % LLDPE. In some embodiments, the second heat sealable sublayer can include about 50-100 wt %, about 60-95 wt %, about 70-90 wt %, about 75-85 wt %, or about 80 wt % polyethylene plastomer. In some embodiments, the second heat sealable sublayer can include about 40-100 wt %, about 50-90 wt %, about 60-80 wt %, about 63-70 wt %, or about 65 wt % ethylene acrylic acid copolymer. In some embodiments, the second heat sealable sublayer can have a thickness of about 15-75 G, about 30-70 G, about 50-70 G, about 40-60 G, about 45-55 G, about 36-56 G, or about 50-56 G.

The third heat sealable sublayer can act as a heat sealable surface layer. In some embodiments, the third heat sealable layer can have the same compositions as the first or second heat sealable layer described above. In some embodiments, the third heat sealable layer can include metallocene-catalyzed polypropylene, propylene-butylene copolymer, low density polyethylene (LDPE), linear low density polyethylene (LLDPE), ethylene acrylic acid copolymer, and/or polyethylene plastomer. In some embodiments, the third heat sealable sublayer can include about 60-100 wt %, about 70-99 wt %, about 80-95 wt %, about 80-90 wt %, about 85-95 wt %, about 89-91 wt %, or about 90 wt % metallocene-catalyzed polypropylene. In some embodiments, the third heat sealable sublayer can include about 0-40 wt %, about 1-30 wt %, about 4-20 wt %, about 15-20 wt %, about 10-18 wt %, about 5-15 wt %, about 8-12 wt %, or about 10 wt % propylene-butylene copolymer. In some embodiments, the third heat sealable sublayer can include about 0-60 wt %, about 5-50 wt %, about 20-40 wt %, about 25-35 wt %, about 28-32 wt %, or about 30 wt % LDPE. In some embodiments, the third heat sealable sublayer can include about 0-50 wt %, about 5-40 wt %, about 10-30 wt %, about 15-25 wt %, about 15-20 wt %, or about 20 wt % LDPE. In some embodiments, the third heat sealable sublayer can include at least about 70 wt %, about 80 wt %, about 90 wt %, about 95 wt %, or about 100 wt % LDPE. In some embodiments, the third heat sealable sublayer can include about 80-100 wt %, about 90-100 wt %, about 94-100 wt %, or about 95 wt % LLDPE. In some embodiments, the third heat sealable sublayer can include about 50-100 wt %, about 60-95 wt %, about 70-90 wt %, about 75-85 wt %, or about 80 wt % LLDPE. In some embodiments, the third heat sealable sublayer can include about 80-100 wt %, about 90-100 wt %, about 94-100 wt %, about 95-100 wt %, or about 95-99 wt % LLDPE. In some embodiments, the third heat sealable sublayer can include about 50-100 wt %, about 60-95 wt %, about 70-90 wt %, about 75-85 wt %, or about 80 wt % polyethylene plastomer. In some embodiments, the third heat sealable sublayer can include about 40-100 wt %, about 50-90 wt %, about 60-80 wt %, about 63-70 wt %, or about 65 wt % ethylene acrylic acid copolymer. In some embodiments, the third heat sealable sublayer can include about 70-100 wt %, about 80-99 wt %, about 90-97 wt %, or about 95 wt % ethylene acrylic acid copolymer. In some embodiments, the third heat sealable sublayer can have a thickness of about 4-30 G, about 8-20 G, about 10-20 G, about 10-15 G, or about 12-18 G.

Any of the first, second, or third heat sealable sublayers can be on a side of the heat stable layer or on a side of the primer layer opposite the heat stable layer. In addition, although the sublayers have been labeled as first, second, and third sublayers, the sublayers can be in any order (i.e., 10→12a→12b→12c; 10→12a→12c→12b; 10→12b→12a→12c; 10→12b→12c→12a; 10→12c→12b→12a; 10→12c→12a→12b). In addition, any one of the sublayers can be removed from the heat sealable layer. Furthermore, the heat sealable layer can be a mono-layer that consists of any one of the sublayers.

The heat sealable layer (or layers of the heat sealable layer) can include a lower melting point polypropylene, polypropylene copolymer, polyethylene, and/or polyethylene copolymer, or blends thereof. In some embodiments, the heat sealable layer can be formulated out of polypropylene, propylene copolymers, polyethylene, ethylene copolymers, or blends of these. Polypropylene is a thermoplastic material made by the free radical polymerization of propylene gas. Propylene copolymers are made in a similar manner, but incorporate one or more other monomers (comonomers) into the polymer. Typical comonomers include ethylene and butylene. Polyethylene can be made in a process similar to polypropylene, only using ethylene feed stock instead of the propylene feed stock, or it can be made in an autoclave process in a solution phase reaction. The latter method is typically preferred for extrusion-coating applications as the molecular architecture and molecular weight distribution both contribute to better processability. Ethylene copolymers are more varied than propylene copolymers; some typical comonomers for sealant polyethylenes are vinyl acetate, acrylic acid, methacrylic acid, ethyl acrylate, propylene, 1-butene, 1-hexene, and 1-octene, methyl acrylate, and butyl acrylate.

Antiblock and/or slip additives can be added to the heat sealable layer including any individual layer or multiple layers of the heat sealable layer in an amount of about 0-10 wt %, about 1-9 wt %, about 1-6 wt %, about 1-5 wt %, or about 2-5 wt % the layer. Antiblock and/or slip additives can be added to the heat sealable layer including any individual layer or multiple layers of the heat sealable layer in an amount of about 0.01-0.5 wt %, about 0.03-0.4 wt %, or about 0.1-0.4 wt % the layer. In some embodiments, antiblock and/or slip additives can be added to the heat sealable layer including any individual layer or multiple layers of the heat sealable layer in an amount of about 0-6 wt %, about 0-4 wt %, about 1-4 wt %, about 1-3 wt %, or about 1-2 wt % of the layer. Examples of antiblock and/or slip additives that may be used for polyester film applications can include amorphous silica particles with mean particle size diameters in the range of about 0.05-0.1 µm at concentrations of 0.1-0.4 wt % the film or layer; calcium carbonate particles with a medium particle size of 0.3-1.2 µm at concentrations of 0.03-0.2 wt % the film or layer; and precipitated alumina particles of sub-micron sizes with an average particle size of about 0.1 µm at concentrations of 0.1-0.4 wt % the film or layer. Additional examples include inorganic particles, aluminum oxide, magnesium oxide, titanium oxide, such complex oxides as kaolin, talc, and montmorillonite, such carbonates as calcium carbonate and barium carbonate, such sulfates as calcium sulfate and barium sulfate, such titanates as barium titanate and potassium titanate, and such phosphates as tribasic calcium phosphate, dibasic calcium phosphate, and monobasic calcium phosphate, or combinations thereof. Two or more of these may be used together to achieve a specific objective. As examples of organic particles, vinyl materials such as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene may be used or contemplated in the heat sealable layer or layers of the heat sealable layer. In some embodiments, the additives can be only in the outermost sublayer of the heat sealable layer, i.e., the layer that is furthest from the heat stable layer. One or more of the sublayers in a multilayer heat sealable layer can be free of additives in the sub-layer. One way to incorporate the aforementioned antiblock particles can be via masterbatch addition. Antiblock and/or slip additives can be added to the heat sealable layer in the form of a masterbatch in a carrier resin or to any individual layer or multiple layers of the heat sealable layer in an amount of about 0-10 wt %, about 1-9 wt %, about 1-6 wt %, about 1-5 wt %, about 2-5 wt %, about 1-3 wt %, about 2-3 wt %, or about 1-2 wt % of the masterbatch in the layer.

A lap sealable layer (14) can be applied to one side of the heat stable layer. In some embodiments, the lap sealable layer can be applied to the side of the heat stable layer opposite the heat sealable layer. In some embodiments, a lap sealable layer can be applied to the skin layer, the core layer, and/or the lap seal receiving layer of the heat stable layer. The lap sealable layer can be less heat stable than the heat stable layer and compatible with the heat-sealable layer. This can allow for the film to be lap sealed, in which the heat-sealable layer is sealed to the lap sealable layer, forming a tube. Additional layers may be present between either or both of the lap sealable layer and the heat stable layer and the heat stable layer and the heat-sealable layer for ease of manufacturing, improved properties, or cost reasons.

In some embodiments, a primer layer can be applied to one side of the heat stable layer. In some embodiments, a primer layer can be applied to both sides of the heat stable layer. In some embodiments, a primer layer can be applied to the skin layer, the core layer, and/or the lap seal receiving layer of the heat stable layer. In some embodiments, the primer layer can be between the lap sealable layer and the heat stable layer. For example, the figures disclose primer layer 13 between lap sealable layer 14 and heat stable layer 10. In some embodiments, the primer layer can be added by a solution coating method, such as gravure roll coating. In some embodiments, the primer layer comprises polyethylenimine. In some embodiments, the dry coat weight of the primer layer can be up to about 0.03 pounds per ream. In some embodiments, the dry coat weight of the primer layer can be about 0.005-0.02, about 0.0075-0.015, about 0.0075-0.0125, or about 0.01 pounds per ream. The primer layer can help ensure strong adhesion of the lap sealable layer to the heat stable layer. In some embodiments, the primer layer can be formed using MICA A-131-X or MICA H-760-A. In some embodiments, the lap sealable layer can be extrusion-coated on the primer layer or on the heat stable layer.

The lap sealable layer can be mono-layered or multi-layered. In some embodiments, the lap sealable layer can include 2-3 layers. In some embodiments, the lap sealable layer can include a bonding layer, a seal enhancing layer, and/or a heat sealable surface. The bonding and seal enhancing layer can act as a compressible layer to aid in the forming of a hermetic seal, and can be formulated to adhere to the primer layer and/or a lap seal receiving layer. The primer layer can be a thin coating layer applied to a BOPET film to promote the adhesion between the film and the bonding and seal enhancing layer and between the film and the bonding layer. The bonding layer can be formulated to adhere to the primer layer and the seal enhancing layer. The seal enhancing layer can act as a compressible and conformable layer to aid in the forming of a hermetic seal. Each of these sublayers can be extrusion-coated either individually or together on the primer layer or on the heat stable layer. In addition, each of these layers can be coextruded together with or without the heat stable layer. For example, some of the figures illustrate sublayers 14a, 14b, and 14c of lap sealable layer 14.

The first lap sealable sublayer can act as a bonding layer to the heat stable layer. In some embodiments, the first lap sealable layer can have the same compositions as the first, second, or third heat sealable layers described above. In some embodiments, the first lap sealable layer can include metallocene-catalyzed polypropylene, low density polyethylene (LDPE), linear low density polyethylene (LLDPE), and/or polyethylene plastomer. In some embodiments, the first lap sealable sublayer can include about 40-100 wt %, about 50-95 wt %, about 60-80 wt %, about 65-75 wt %, about 68-72 wt %, or about 70 wt % metallocene-catalyzed polypropylene. In some embodiments, the first lap sealable sublayer can include about 0-60 wt %, about 5-50 wt %, about 20-40 wt %, about 25-35 wt %, about 28-32 wt %, or about 30 wt % LDPE. In some embodiments, the first lap sealable sublayer can include about 0-50 wt %, about 5-40 wt %, about 10-30 wt %, about 15-25 wt %, or about 20 wt % LDPE. In some embodiments, the first lap sealable sublayer can include at least about 70 wt %, about 80 wt %, about 90 wt %, about 95 wt %, or about 100 wt % LDPE. In some embodiments, the first lap sealable sublayer can include about 80-100 wt %, about 90-100 wt %, about 94-100 wt %, or about 95 wt % LLDPE. In some embodiments, the first lap sealable sublayer can include about 50-100 wt %, about 60-95 wt %, about 70-90 wt %, about 75-85 wt %, or about 80 wt % polyethylene plastomer.

In some embodiments, the first lap sealable sublayer can have a thickness of about 15-75 G, about 30-70 G, about 40-60 G, about 40-50 G, about 40-45 G, or about 45-55 G. In some embodiments, the first lap sealable sublayer can have a thickness of about 15-75 G, about 30-70 G, about 36-56 G, about 35-45 G, or about 40 G.

The second lap sealable sublayer can act as a seal enhancing layer. In some embodiments, the second lap sealable layer can have the same compositions as the first, second, or third heat sealable layers described above. In some embodiments, the second lap sealable layer can have the same compositions as the first lap sealable layer described above. In some embodiments, the second lap sealable layer can include metallocene-catalyzed polypropylene, low density polyethylene (LDPE), linear low density polyethylene (LLDPE), ethylene acrylic acid copolymer, propylene-butylene copolymer, and/or polyethylene plastomer. In some embodiments, the second lap sealable sublayer can include about 40-100 wt %, about 50-95 wt %, about 60-80 wt %, about 65-75 wt %, about 68-72 wt %, or about 70 wt % metallocene-catalyzed polypropylene. In some embodiments, the second lap sealable sublayer can include about 60-100 wt %, about 70-99 wt %, about 80-95 wt %, about 80-90 wt %, about 85-95 wt %, about 89-91 wt %, or about 90 wt % metallocene-catalyzed polypropylene. In some embodiments, the second lap sealable sublayer can include about 0-60 wt %, about 5-50 wt %, about 20-40 wt %, about 25-35 wt %, about 28-32 wt %, or about 30 wt % LDPE. In some embodiments, the second lap sealable sublayer can include about 0-50 wt %, about 5-40 wt %, about 10-30 wt %, about 15-25 wt %, or about 20 wt % LDPE. In some embodiments, the second lap sealable sublayer can include at least about 70 wt %, about 80 wt %, about 90 wt %, about 95 wt %, or about 100 wt % LDPE. In some embodiments, the second lap sealable sublayer can include about 80-100 wt %, about 90-100 wt %, about 94-100 wt %, or about 95 wt % LLDPE. In some embodiments, the second lap sealable sublayer can include about 50-100 wt %, about 60-95 wt %, about 70-90 wt %, about 75-85 wt %, or about 80 wt % LLDPE. In some embodiments, the second lap sealable sublayer can include about 50-100 wt %, about 60-95 wt %, about 70-90 wt %, about 75-85 wt %, or about 80 wt % polyethylene plastomer. In some embodiments, the second lap sealable sublayer can include about 40-100 wt %, about 50-90 wt %, about 60-80 wt %, about 63-70 wt %, or about 65 wt % ethylene acrylic acid copolymer. In some embodiments, the second lap sealable sublayer can include about 0-40 wt %, about 1-30 wt %, about 4-20 wt %, about 10-18 wt %, about 5-15 wt %, about 8-12 wt %, or about 10 wt % propylene-butylene copolymer.

In some embodiments, the second lap sealable sublayer can have a thickness of about 15-75 G, about 30-70 G, about 4-60 G, about 50-70 G, about 40-60 G, about 45-55 G, about 36-56 G, or about 50-56 G. In some embodiments, the second lap sealable sublayer can have a thickness of about 4-30 G, about 8-20 G, about 10-20 G, about 10-15 G, or about 12-18 G.

The third lap sealable sublayer can act as a heat sealable surface layer. In some embodiments, the third lap sealable layer can have the same compositions as the first, second, or third heat sealable layers described above. In some embodiments, the third lap sealable layer can have the same compositions as the first or second lap sealable layer described above. In some embodiments, the third lap sealable layer can include metallocene-catalyzed polypropylene, propylene-butylene copolymer, low density polyethylene (LDPE), linear low density polyethylene (LLDPE), ethylene acrylic acid copolymer, and/or polyethylene plastomer. In some embodiments, the third lap sealable sublayer can include about 80-100 wt %, about 90-100 wt %, about 95-100 wt %, or about 100 wt % metallocene-catalyzed polypropylene. In some embodiments, the third lap sealable sublayer can include about 60-100 wt %, about 70-99 wt %, about 75-85 wt %, about 80-95 wt %, about 80-90 wt %, about 85-95 wt %, about 88-92 wt %, or about 90 wt % metallocene-catalyzed polypropylene. In some embodiments, the third lap sealable sublayer can include about 0-40 wt %, about 1-30 wt %, about 4-20 wt %, about 15-20 wt %, about 10-18 wt %, about 5-15 wt %, about 8-12 wt %, or about 10 wt % propylene-butylene copolymer. In some embodiments, the third lap sealable sublayer can include about 0-60 wt %, about 5-50 wt %, about 20-40 wt %, about 25-35 wt %, about 28-32 wt %, or about 30 wt % LDPE. In some embodiments, the third lap sealable sublayer can include about 0-50 wt %, about 5-40 wt %, about 10-30 wt %, about 15-25 wt %, about 15-20 wt %, or about 20 wt % LDPE. In some embodiments, the third lap sealable sublayer can include at least about 70 wt %, about 80 wt %, about 90 wt %, about 95 wt %, or about 100 wt % LDPE. In some embodiments, the third lap sealable sublayer can include about 80-100 wt %, about 90-100 wt %, about 94-100 wt %, or about 95 wt % LLDPE. In some embodiments, the third lap sealable sublayer can include about 50-100 wt %, about 60-95 wt %, about 70-90 wt %, about 75-85 wt %, or about 80 wt % LLDPE. In some embodiments, the third lap sealable sublayer can include about 80-100 wt %, about 90-100 wt %, about 94-100 wt %, about 95-100 wt %, or about 95-99 wt % LLDPE. In some embodiments, the third lap sealable sublayer can include about 50-100 wt %, about 60-95 wt %, about 70-90 wt %, about 75-85 wt %, or about 80 wt % polyethylene plastomer. In some embodiments, the third lap sealable sublayer can include about 40-100 wt %, about 50-90 wt %, about 60-80 wt %, about 63-70 wt %, or about 65 wt % ethylene acrylic acid copolymer. In some embodiments, the third lap sealable sublayer can include about 70-100 wt %, about 80-99 wt %, about 90-97 wt %, or about 95 wt % ethylene acrylic acid copolymer. In some embodiments, the third lap sealable sublayer can have a thickness of about 4-30 G, about 8-20 G, about 10-20 G, about 10-15 G, or about 12-18 G.

Any of the first, second, or third lap sealable sublayers can be on a side of the heat stable layer or on a side of the primer layer opposite the heat stable layer. In addition, although the sublayers have been labeled as first, second, and third sublayers, the sublayers can be in any order (i.e., 10→14a→14b→14c; 10→14a→14c→14b; 10→14b→14a→14c; 10→14b→14c→14a; 10→14c→14b→14a; 10→14c→14a→14b). In addition, any one of the sublayers can be removed from the lap sealable layer. Furthermore, the lap sealable layer can be a mono-layer that consists of any one of the sublayers.

The lap sealable layer can include a lower melting point polypropylene, polypropylene copolymer, polyethylene, and/or polyethylene copolymer, or blends thereof. In some embodiments, the lap sealable layer can be formulated out of polypropylene, propylene copolymers, polyethylene, ethylene copolymers, or blends of these. As previously discussed, polypropylene is a thermoplastic material made by the free radical polymerization of propylene gas. Propylene copolymers are made in a similar manner, but incorporate one or more other monomers (comonomers) into the polymer. Typical comonomers include ethylene and butylene. Polyethylene can be made in a process similar to polypropylene, only using ethylene feed stock instead of the propylene feed stock, or it can be made in an autoclave process in a solution phase reaction. The latter method is typically preferred for extrusion-coating applications as the molecular architecture and molecular weight distribution both contribute to better processability. Ethylene copolymers are more varied than propylene copolymers; some typical comonomers for sealant polyethylenes are vinyl acetate, acrylic acid, methacrylic acid, ethyl acrylate, propylene, 1-butene, 1-hexene, and 1-octene, methyl acrylate, and butyl acrylate. The composition of the lap sealable layer can be the same as the compositions of the heat sealable layer described herein.

Antiblock and/or slip additives can be added to the lap sealable layer including any individual layer or multiple layers of the lap sealable layer in an amount of about 0-10 wt %, about 1-9 wt %, about 1-6 wt %, about 1-5 wt %, or about 2-5 wt % the layer. Antiblock and/or slip additives can be added to the lap sealable layer including any individual layer or multiple layers of the lap sealable layer in an amount of about 0.01-0.5 wt %, about 0.03-0.4 wt %, or about 0.1-0.4 wt % the layer. In some embodiments, antiblock and/or slip additives can be added to the lap sealable layer including any individual layer or multiple layers of the lap sealable layer in an amount of about 0-6 wt %, about 0-4 wt %, about 1-4 wt %, about 1-3 wt %, or about 1-2 wt % of the layer. Examples of antiblock and/or slip additives that may be used for polyester film applications can include amorphous silica particles with mean particle size diameters in the range of about 0.05-0.1 μm at concentrations of 0.1-0.4 wt % the film or layer; calcium carbonate particles with a medium particle size of 0.3-1.2 μm at concentrations of 0.03-0.2 wt % the film or layer; and precipitated alumina particles of sub-micron sizes with an average particle size of about 0.1 μm at concentrations of 0.1-0.4 wt % the film or layer. Additional examples include inorganic particles, aluminum oxide, magnesium oxide, titanium oxide, such complex oxides as kaolin, talc, and montmorillonite, such carbonates as calcium carbonate and barium carbonate, such sulfates as calcium sulfate and barium sulfate, such titanates as barium titanate and potassium titanate, and such phosphates as tribasic calcium phosphate, dibasic calcium phosphate, and monobasic calcium phosphate, or combinations thereof. Two or more of these may be used together to achieve a specific objective. As examples of organic particles, vinyl materials such as polystyrene, crosslinked polystyrene, crosslinked styrene-acrylic polymers, crosslinked acrylic polymers, crosslinked styrene-methacrylic polymers, and crosslinked methacrylic polymers, as well as such other materials as benzoguanamine formaldehyde, silicone, and polytetrafluoroethylene may be used or contemplated in the lap sealable layer or layers of the lap sealable layer. In some embodiments, the additives can be only in the outermost sublayer of the lap sealable layer, i.e., the layer that is furthest from the heat stable layer. One or more of the sublayers in a multilayer lap sealable layer can be free of additives in the sub-layer. One way to incorporate the aforementioned antiblock particles can be via masterbatch addition. Antiblock and/or slip additives can be added to the lap sealable layer in the form of a masterbatch in a carrier resin or to any individual layer or multiple layers of the lap sealable layer in an amount of about 0-10 wt %, about 1-9 wt %, about 1-6 wt %, about 1-5 wt %, about 2-5 wt %, about 1-3 wt %, about 2-3 wt %, or about 1-2 wt % of the masterbatch in the layer.

The sealable films disclosed herein can have an overall thickness of about 100-400 G, about 200-300 G, about 225-275 G, about 240-260 G, or about 250 G. In some embodiments, the peak hot tack strength of the sealable film can be about greater than 200 g/in, about 250 g/in, or about 300 g/in measured according to ASTM F1921 Method B. In some embodiments, the peak hot tack temperature of the sealable film can be greater than about 300° F. measured according to ASTM F1921 Method B. In some embodiments, the hot tack strength of the sealable film at 300° F. can be greater than about 200 g/in, about 250 g/in, or about 300 g/in measured according to ASTM F1921 Method B with 0.0 s cool delay. In some embodiments, the hot tack strength of the sealable film can be in excess of about 200 g/in, about 250 g/in, about 300 g/in, or about 350 g/in measured according to ASTM F1921 Method B with 0.0 s cool delay at temperatures in the range of 300-340° F. In some embodiments, the coefficient of friction (COF) of the sealant to sealant of the sealable film can be about 0.2-0.9, about 0.3-0.8, or about 0.4-0.7 static and/or about 0.1-0.9, about 0.2-0.8, or about 0.3-0.7 dynamic measured according to Toray Method which is similar in procedure to ASTM D1894, except in that a four pound (1814 g) sled is used and three specimens are tested. In some embodiments, the coefficient of friction (COF) of the sealant to stainless steel of the sealable film can be about 0.2-0.7, about 0.2-0.6, or about 0.2-0.5 static and/or about 0.2-0.7, about 0.2-0.6, or about 0.2-0.5 dynamic measured according to Toray Method which is similar in procedure to ASTM D1894, except in that a four pound (1814 g) sled is used and three specimens are tested. In some embodiments, the Young's Modulus (MD/TD) of the sealable film can be about 70,000-500,000 lb/in$^2$, or about 100,000-400,000 lb/in$^2$ in the machine direction and/or about 70,000-500,000 lb/in$^2$, or about 100,000-400,000 lb/in$^2$ in the transverse direction.

EXAMPLES

Raw Materials
Base (Substrate) Films:
The following commercial biaxially-oriented polyester films available from Toray Plastics (America), Inc. were used in Examples 1 and 3, and Comparative Examples 1, 2, 3, 4, and 5: Lumirror® PA10 and Lumirror® PA66 comprising polyester such as polyethylene terephthalate (PET) or any polymer or copolymer formed from the polycondensation of a diol (such as but not limited to ethylene glycol, propylene glycol, butylene glycol, and cyclohexanedimethanol) with a diacid (such as but not limited to terephthalic acid, isophthalic acid, naphthalic acid, and 2,6-naphtalenedicarboxylic acid). PA10 is comprised of two coextruded layers, the first or core layer comprised of crystalline PET resin and a sublayer or skin layer comprising of an amorphous copolyester layer; PA66 is a comprised of a single layer of crystalline PET. The following biaxially-oriented polypropylene film was made by Toray Plastics (America), Inc. and used in Example 2: Treax® TXHC14 comprising of two coextruded layers, having a first or core layer comprised of homopolymer polypropylene (peak melting temperature 163° C.) and a second sublayer or skin layer comprised of a random copolymer of propylene and ethylene (peak melting temperature 144° C.).

Total M3766: A metallocene-catalyzed polypropylene (mPP) resin produced by Total Petrochemicals having a nominal density of 0.9 g/cc (per ASTM D-1505), a nominal melt flow rate of 24 g/10 min (per ASTM D-1238 with 2.16 kg at 230° C.), and a peak melting temperature of 151° C. (as determined by DSC measurements).

DOW LDPE 722: An autoclave-polymerized low density polyethylene (LDPE) produced by DOW Chemical Company having a nominal density of 0.918 g/cc (per ASTM D-792), a nominal melt index of 8.0 g/10 min (per ASTM D-1238 with 2.16 kg at 190° C.), and a peak melting temperature of 107° C. (as determined by DSC measurements).

Tafmer® XM7070: A propylene-co-butylene copolymer resin produced by Mitsui Chemicals having a nominal melt index of 3.0 g/10 min (per ASTM D-1238 with 2.16 kg at 190° C.), a nominal melt flow rate of 7.0 g/10 min (per ASTM D-1238 with 2.16 kg at 230° C.), and a peak melting temperature of 75° C. (as determined by DSC measurements).

Polybatch® ABVT19NSC: A spherical antiblock masterbatch produced by A. Schulman having a nominal density of 0.920 g/cc (per DIN 53479), a nominal melt flow rate of 6.0 g/10 min (per DIN 53735 with 2.16 kg at 230° C.), and an antiblock additive content loading of 6.0 wt % of the masterbatch. The carrier resin is a propylene-butylene-ethylene copolymer.

MICA A-131-X: A water-based modified polyethylenimine resin dispersion produced by MICA Corporation having a solids content of about 5% by weight, a viscosity of about 25 cP at 25° C., and a pH of about 10.7 at 25° C.

MICA H-760-A: A water-based modified polyethylenimine resin dispersion produced by MICA Corporation having a solids content of about 12% by weight, a viscosity of about 50 cP at 25° C., and a pH of about 9 at 25° C.

Dowlex® 3010: A linear low density polyethylene (LLDPE) produced by DOW Chemical Company using ethylene and 1-octene feed stock having a nominal density of 0.921 g/cc (per ASTM D-792), a nominal melt index of 5.4 g/10 min (per ASTM D-1238 with 2.16 kg at 190° C.), and a peak melting temperature of 124° C. (as determined by DSC measurements).

PM14598: A slip masterbatch produced by Techmer PM in a polyethylene carrier resin.

Polybatch® F20: A natural silica antiblock masterbatch produced by A. Schulman having a nominal density of 1.04 g/cc (per ASTM D-792), a nominal melt index of 8.0 g/10 min (per ASTM D-1238 with 2.16 kg at 190° C.), and an inorganic loading of 20% by weight (per ASTM D-5630).

Affinity® PT 1450G1: A linear low density polyethylene (LLDPE) polyolefin plastomer produced by DOW Chemical Company using ethylene and 1-octene feed stock having a nominal density of 0.902 g/cc (per ASTM D-792), a nominal melt index of 7.5 g/10 min (per ASTM D-1238 with 2.16 kg at 190° C.), and a peak melting temperature of 97.8° C. (as determined by DSC measurements).

Elite® 5815: A linear low density polyethylene (LLDPE) produced by DOW Chemical Company using ethylene and 1-octene feed stock having a nominal density of 0.910 g/cc (per ASTM D-792), a nominal melt index of 15 g/10 min (per ASTM D-1238 with 2.16 kg at 190° C.), and a peak melting temperature of 124° C. (as determined by DSC measurements).

Primacor® 3440: A copolymer of ethylene and acrylic acid (EAA) produced by DOW Chemical Company having a comonomer content of 9.7 wt % acrylic acid, a nominal density of 0.938 g/cc (per ASTM D-792), a nominal melt index of 11 g/10 min (per ASTM D-1238 with 2.16 kg at 190° C.), a peak melting temperature of 97.8° C. (per DSC measurements).

Marflex® 1017: An autoclave-polymerized low density polyethylene (LDPE) produced by Chevron Phillips having a nominal density of 0.917 g/cc (per ASTM D-1505), a nominal melt index of 7 g/10 min (per ASTM D-1238 with 2.16 kg at 190° C.), and a peak melting temperature of 104° C. (per ASTM D-3418).

Example 1

Figure 5:
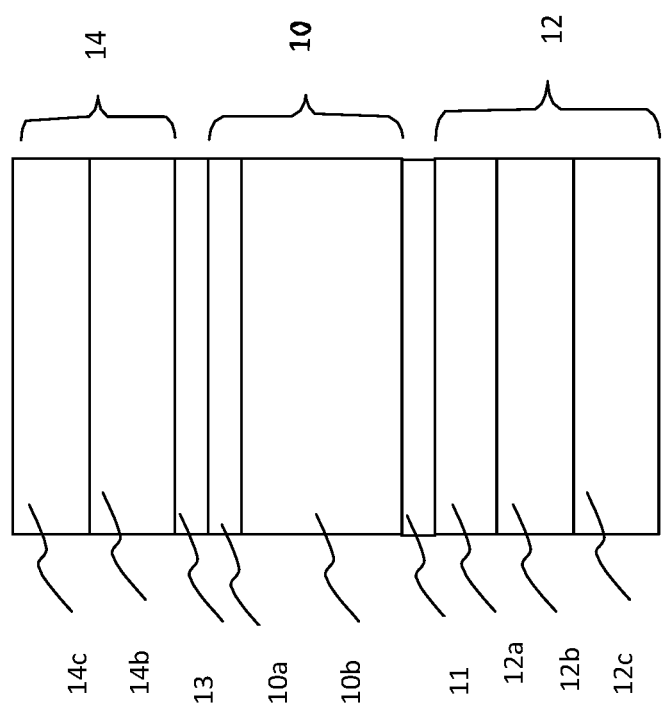
FIG. 5 illustrates an example of a third embodiment of a sealable film disclosed herein.

The film of example 1 resembles the film structure shown in FIG. 5. Commercially available Lumirror® PET film (PA10, 92 G (23µ) nominal thickness) was first corona-treated with 1.3 W/ft$^2$/min on the amorphous copolyester adhesion layer side of PA10, and then coated with a commercially available polyethylenimine (PEI) primer (MICA A-131-X) such that the dry coat weight of primer was about 0.01 pounds per ream.

The primed surface of the PA10 film was then extrusion-coated with a lap sealable layer comprised of two coextruded layers: the first layer adjacent to the primed surface of the PA10 film was about 50 G (12.7µ) thick and comprised of about 70 wt % commercially available metallocene-catalyzed polypropylene (Total M3766) and about 30 wt % commercially available autoclave-reacted low density polyethylene (DOW LDPE 722); the second layer was about 15 G (3.8µ) thick and comprised of about 89 wt % commercially available metallocene-catalyzed polypropylene (Total M3766), about 10 wt % commercially available propylene-butylene copolymer (Tafmer® XM7070), and about 1 wt % commercially available antiblock masterbatch in a propylene-butylene-ethylene copolymer carrier resin (A. Schulman ABVT19NSC).

This composite film of PA10/primer/extrusion-coated lap sealable layer was then processed on the opposing side (the core layer side of PA10) in the following manner: the remaining non-extrusion-coated side of the composite film (i.e. the crystalline PET core layer side of the PA10 substrate film) was corona-treated and primed as described above. This second primed surface was then extrusion-coated with a heat sealable layer comprising three layers: the first layer adjacent to the primed crystalline PET side of the composite film was about 28 G (7.1µ) thick and comprised about 70 wt % commercially available metallocene-catalyzed polypropylene (Total M3766) and about 30 wt % commercially available autoclave-reacted low density polyethylene (DOW LDPE 722); the second layer adjacent to the first layer (on the side of the crystalline PET core layer of PA10) was about 50 G (12.7µ) thick and comprised the same blend as the first layer; the third layer adjacent to the second layer (on the side of the crystalline PET core layer of PA10) was about 15 G (3.8µ) and comprised about 89 wt % commercially available metallocene-catalyzed polypropylene (Total M3766), about 10 wt % commercially available propylene-butylene copolymer (Tafmer® XM7070), and about 1 wt % commercially available antiblock masterbatch in a propylene-butylene-ethylene copolymer carrier (A. Schulman ABVT19NSC).

The resultant overall composite film structure of Example 1 was about 250 G (63.5µ) thick. This film structure worked satisfactorily for the application in both hot and cold fill, and with various cooking and reheating methods.

Example 2

Figure 6:
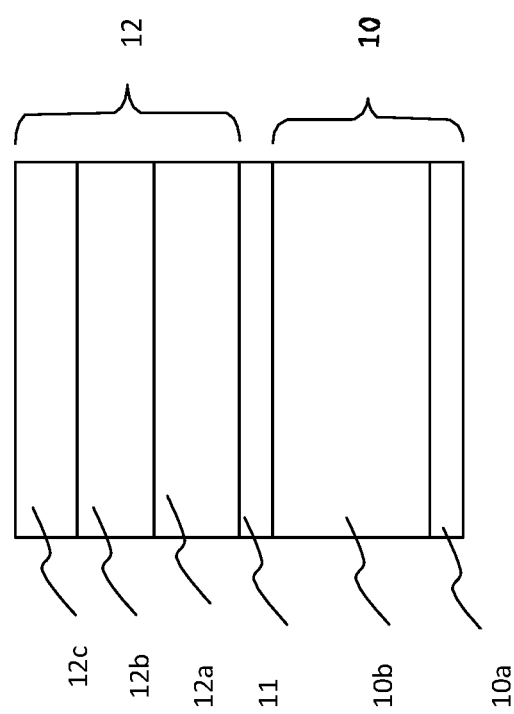
FIG. 6 illustrates an example of a fourth embodiment of a sealable film disclosed herein.

The film of example 2 resembles the film structure shown in FIG. 6. Treax® biaxially oriented polypropylene film (TXHC14, 150 G (38µ) nominal thickness) was first corona-treated with 1.3 W/ft²/min on its propylene homopolymer core layer side opposite its coextruded lap sealant receiving skin layer; and then coated with a commercially available polyethylenimine (PEI) primer (MICA A-131-X) such that the dry coat weight of primer was about 0.01 pounds per ream.

The primed surface of the film was then extrusion-coated with a heat sealable layer upon the primed surface with three layers—the first layer adjacent to the primed surface of the film was about 30 G (7.6µ) thick and comprised about 70 wt % commercially available metallocene-catalyzed polypropylene (Total M3766) and about 30 wt % commercially available autoclave-reacted low density polyethylene (DOW LDPE 722); the second layer adjacent to the first layer was about 54 G (13.7µ) thick and comprised the same blend as the first layer; the third layer adjacent to the second layer was about 16 G (4.1µ) thick and comprised about 89 wt % commercially available metallocene-catalyzed polypropylene (Total M3766), about 10 wt % commercially available propylene-butylene copolymer (Tafmer® XM7070), and about 1 wt % commercially available antiblock masterbatch in a propylene-butylene-ethylene copolymer carrier (A. Schulman ABVT19NSC).

The resultant overall composite film structure of Example 2 was about 250 G (63.5µ) thick. This film structure worked satisfactorily for the application in both hot and cold fill, and with various cooking and reheating methods.

Example 3

The film of example 3 resembles the film structure shown in FIG. 5. Commercially available Lumirror® PET film (PA10, 92 G (23µ) nominal thickness) was first corona-treated with 1.3 W/ft²/min on the amorphous copolyester adhesion layer side of PA10, and then coated with a commercially available polyethylenimine (PEI) primer (MICA A-131-X) such that the dry coat weight of primer was about 0.01 pounds per ream.

The primed surface of the PA10 film was then extrusion-coated with a lap sealable layer comprised of two coextruded layers: the first layer adjacent to the primed surface of the PA10 film was about 44 G (11.2µ) thick and comprised of about 70 wt % commercially available metallocene-catalyzed polypropylene (Total M3766) and about 30 wt % commercially available autoclave-reacted low density polyethylene (DOW LDPE 722); the second layer was about 13 G (3.3µ) thick and comprised of about 100 wt % commercially available metallocene-catalyzed polypropylene (Total M3766).

This composite film of PA10/primer/extrusion-coated lap sealable layer was then processed on the opposing side (the core layer side of PA10) in the following manner: the remaining non-extrusion-coated side of the composite film (i.e. the crystalline PET core layer side of the PA10 substrate film) was corona-treated and primed as described above. This second primed surface was then extrusion-coated with a heat sealable layer comprising three layers—the first layer adjacent to the primed crystalline PET side of the composite film was about 29 G (7.4µ) thick and comprised about 70 wt % commercially available metallocene-catalyzed polypropylene (Total M3766) and about 30 wt % commercially available autoclave-reacted low density polyethylene (DOW LDPE 722); the second layer adjacent to the first layer (on the side of the crystalline PET core layer of PA10) was about 56 G (14.2µ) thick and comprised the same blend as the first layer; the third layer was adjacent to the second layer (on the side of the crystalline PET core layer of PA10) and was about 16 G (4.1µ) thick and comprised about 81 wt % commercially available metallocene-catalyzed polypropylene (Total M3766), about 18 wt % commercially available propylene-butylene copolymer (Tafmer® XM7070), and about 1 wt % commercially available antiblock masterbatch in a propylene-butylene-ethylene copolymer carrier (A. Schulman ABVT19NSC).

The resultant composite film structure of Example 3 was about 250 G (63.5µ) thick. This example is expected to perform with similar results as Example 1, but allow for higher packaging speeds due to the increased differential in melting points between the lap sealable layer and the sealant layer allowing for higher temperature sealing jaws or platens.

Comparative Example 1

Figure 7:
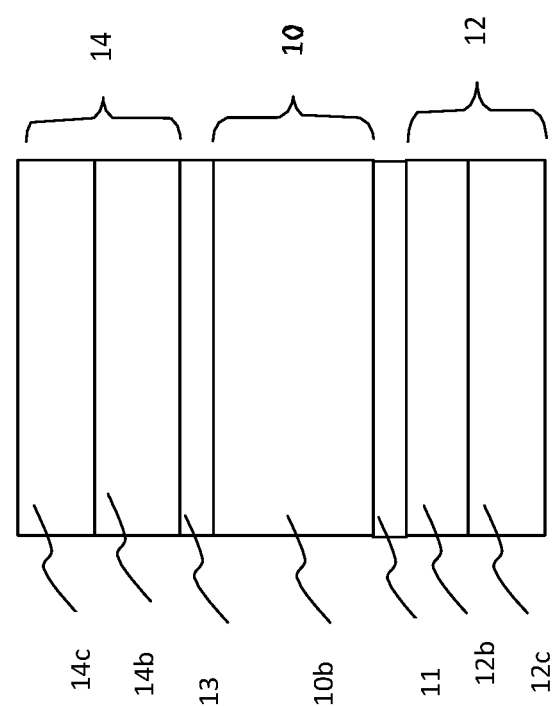
FIG. 7 illustrates an example of a fifth embodiment of a sealable film disclosed herein.

The film of comparative example 1 resembles the film structure shown in FIG. 7. Commercially available Lumirror® PET film (PA66, 200 G (50µ) nominal thickness) was first corona-treated with 2.0 W/ft²/min on one side, and then coated with a commercially available polyethylenimine (PEI) primer (MICA A-131-X) such that the dry coat weight of primer was about 0.01 pounds per ream.

The primed surface of the film was then extrusion-coated with a lap sealable layer comprised of two coextruded layers: the first layer adjacent to the primed surface was about 44.3 G (11.3μ) thick and comprised of about 95 wt % commercially available linear low density polyethylene (Dowlex® 3010), about 3 wt % commercially available slip additive masterbatch (PM14598), and about 2 wt % commercially available antiblock additive masterbatch (A. Schulman Polybatch® F20); the second layer was about 10.4 G (2.6μ) thick and comprised of about 95.5 wt % commercially available linear low density polyethylene (Dowlex® 3010), about 3 wt %, and about 1.5 wt % commercially available antiblock additive masterbatch (A. Schulman Polybatch® F20).

This composite film of PA66/primer/extrusion-coated lap sealable layer was then processed on the opposing side (the remaining non-extrusion-coated side) in the following manner: the non-extrusion-coated side of the composite film was corona-treated and primed as described above. The second primed surface of the composite film was then extrusion coated with a heat sealable layer comprising two coextruded layers: the first layer adjacent to the primed surface was about 44.3 G (11.3μ) thick and comprised of about 95 wt % commercially available linear low density polyethylene (Dowlex 3010), about 3 wt % commercially available slip additive masterbatch (PM14598), and about 2 wt % commercially available antiblock additive masterbatch (A. Schulman Polybatch® F20); the second layer adjacent to the first layer was about 10.4 G (2.6μ) thick and comprised of about 95.5 wt % commercially available linear low density polyethylene (Dowlex® 3010), about 3 wt % commercially available slip additive masterbatch (PM14598), and about 1.5 wt % commercially available antiblock additive masterbatch (A. Schulman Polybatch® F20).

The overall composite film structure of comparative example 1 was about 300 G (76.2μ) thick. This composite structure did not have sufficient hot tack strength to be successful in packaging and it did not have enough sealant thickness for the given conformability of the formulation and stiffness of the base (substrate) film to hermetically seal the corners of the packages.

Comparative Example 2

Figure 8:
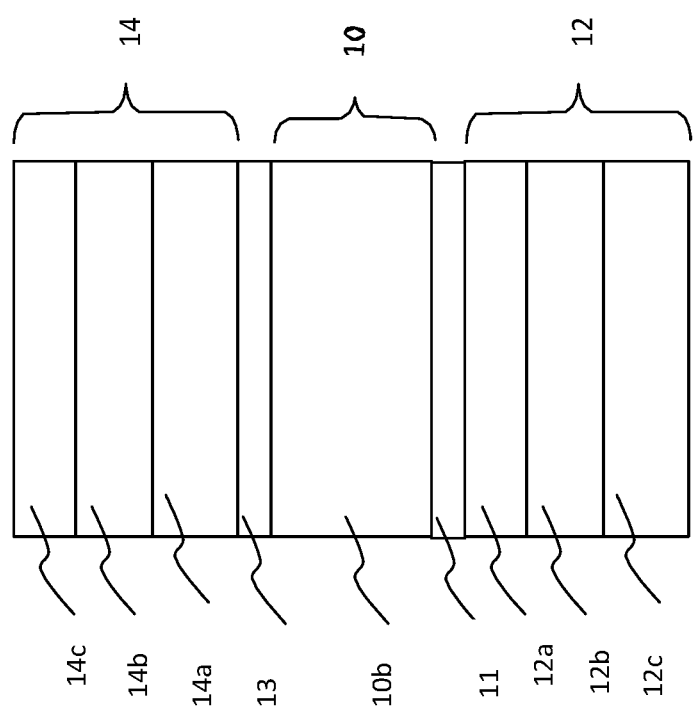
FIG. 8 illustrates an example of a sixth embodiment of a sealable film disclosed herein.

The film of comparative example 2 resembles the film structure shown in FIG. 8. Commercially available Lumirror® PET film (PA66, 200 G (50μ) nominal thickness) was first corona-treated with 1.3 W/ft²/min on one side, and then coated with a commercially available polyethylenimine (PEI) primer (MICA H-760-A) such that the dry coat weight of primer was about 0.01 pounds per ream.

The primed surface of the PA66 film was then extrusion-coated with a lap sealable layer comprised of three layers: the first layer adjacent to the primed surface was about 40 G (10.2μ) thick and comprised of about 80 wt % commercially available polyethylene plastomer (DOW Affinity® PT 1450G1) and about 20 wt % commercially available autoclave-polymerized low density polyethylene (DOW LDPE 722); the second layer was about 64 G (16.3μ) thick and comprised of about 70 wt % commercially available metallocene-catalyzed polypropylene (Total M3766) and about 30 wt % commercially available autoclave-polymerized low density polyethylene (DOW LDPE 722); the third layer was about 16 G (4.1μ) thick and comprised of about 88 wt % commercially available metallocene-catalyzed polypropylene (Total M3766), about 10 wt % commercially available propylene-butylene copolymer (Tafmer® XM7070), and about 2 wt % commercially available antiblock masterbatch in a propylene-butylene-ethylene copolymer carrier (A. Schulman ABVT19NSC).

The composite film of PA66/primer/extrusion-coated lap sealable layer was then processed on the remaining non-extrusion-coated side in the following manner: the film was corona-treated and primed upon the non-extrusion-coated side as described above. The second primed surface of the composite film was then extrusion-coated with a heat sealable layer comprising three layers: the first layer adjacent to the second primed surface was about 40 G (10.2μ) thick and comprised of about 80 wt % commercially available polyethylene plastomer (DOW Affinity® PT 1450G1) and about 20 wt % commercially available autoclave-polymerized low density polyethylene (DOW LDPE 722); the second layer was adjacent to the first layer and was about 64 G (16μ) thick and comprised of about 70 wt % commercially available metallocene-catalyzed polypropylene (Total M3766) and about 30 wt % commercially available autoclave-polymerized low density polyethylene (DOW LDPE 722); the third layer was about 16 G (4.1μ) thick and comprised of about 88 wt % commercially available metallocene-catalyzed polypropylene (Total M3766), about 10 wt % commercially available propylene-butylene copolymer (Tafmer® XM7070), and about 2 wt % commercially available antiblock masterbatch in a propylene-butylene-ethylene copolymer carrier (A. Schulman ABVT19NSC).

The resultant overall composite film structure of comparative example 2 was about 440 G (111.7μ) thick. This composite structure did not have enough hermeticity to fully contain a high liquid content food.

Comparative Example 3

Figure 9:
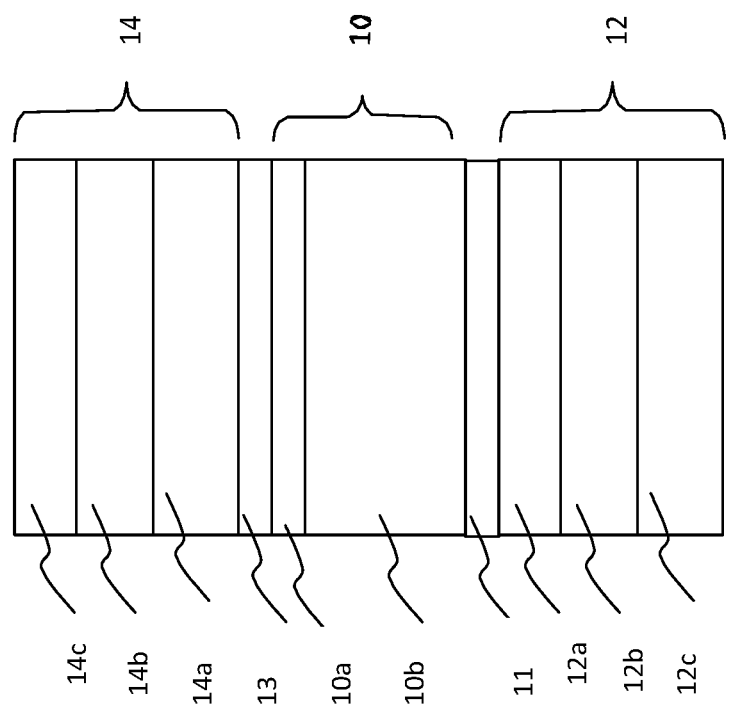
FIG. 9 illustrates an example of a seventh embodiment of a sealable film disclosed herein.

The film of comparative example 3 resembles the film structure shown in FIG. 9. Commercially available Lumirror® PET film (PA10, 92 G (23μ) nominal thickness) was first corona-treated with 1.3 W/ft²/min on the amorphous copolyester adhesion layer, and then coated with a commercially available polyethylenimine (PEI) primer (MICA A-131-X) such that the dry coat weight of primer was about 0.01 pounds per ream.

The primed surface of the film was then extrusion-coated with a lap sealable layer comprising three layers: the first layer adjacent to the primed surface was about 38.8 G (9.9μ) thick and comprised about 100 wt % commercially available autoclave-polymerized low density polyethylene (DOW LDPE 722); the second layer was adjacent to the first layer and was about 49.7 G (12.6μ) thick and comprised about 80 wt % commercially available linear low density polyethylene (DOW Elite® 5815) and about 20 wt % commercially available autoclave-polymerized low density polyethylene (DOW LDPE 722); the third layer was adjacent to the second layer and was about 15.5 G (3.9μ) thick and comprised about 80 wt % commercially available linear low density polyethylene (DOW Elite® 5815), about 16 wt % commercially available autoclave-polymerized low density polyethylene (DOW LDPE 722), and about 4 wt % commercially available antiblock additive masterbatch (A. Schulman Polybatch® F20).

The composite film of PA10/primer/lap sealable layer was then processed on the remaining non-extrusion-coated opposing side in the following manner: the film was corona-treated and primed on the non-extrusion-coated side as described above. The primed surface of the composite film was then extrusion-coated with a heat sealable layer comprising three layers: the first layer adjacent to the primed surface of the composite film was about 38.8 G (9.9μ) thick and comprised about 100 wt % commercially available autoclave-polymerized low density polyethylene (DOW LDPE 722); the second layer was adjacent to the first layer and was about 49.7 G (12.6μ) thick and comprised about 80 wt % commercially available linear low density polyethylene (DOW Elite® 5815) and about 20 wt % commercially available autoclave-polymerized low density polyethylene (DOW LDPE 722); the third layer was adjacent to the second layer and was about 15.5 G (3.9μ) thick and comprised about 80 wt % commercially available linear low density polyethylene (DOW Elite® 5815), about 16 wt % commercially available autoclave-polymerized low density polyethylene (DOW LDPE 722), and about 4 wt % commercially available antiblock additive masterbatch (A. Schulman Polybatch® F20).

The resultant overall composite film structure of comparative example 3 was about 300 G (76.2μ) thick. This composite structure did not have enough hot tack strength for the packaging operation, and in particular did poorly when the seal area had a thin coating of liquid food residue in it.

Comparative Example 4

Figure 10:
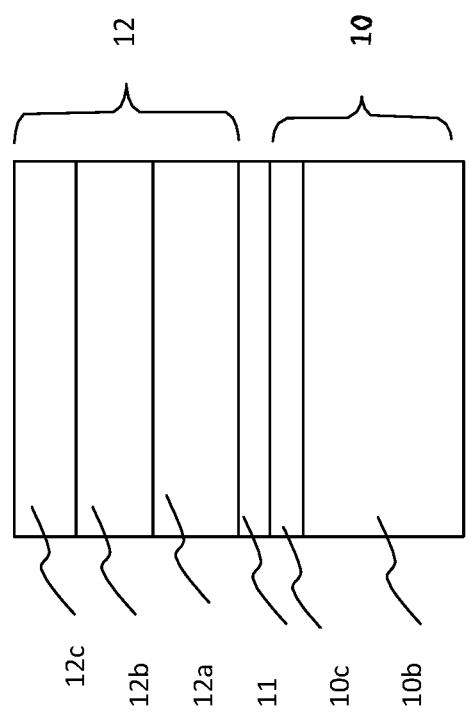
FIG. 10 illustrates an example of an eighth embodiment of a sealable film disclosed herein.

The film of comparative example 4 resembles the film structure shown in FIG. 10. Commercially available Lumirror® PET film (PA10, 48 G (12μ) nominal thickness) was first corona-treated with 1.2 W/ft$^2$/min on the amorphous copolyester adhesion layer and then coated with a commercially available polyethylenimine (PEI) primer (MICA A-131-X) such that the dry coat weight of primer was about 0.01 pounds per ream.

The primed surface was then extrusion-coated with a heat seal layer comprising three layers: the first layer adjacent to the primed surface was about 24.4 G (6.2μ) thick and comprised about 100 wt % commercially available autoclave-polymerized low density polyethylene (Chevron Marflex® 1017); the second layer was adjacent to the first layer and was about 64 G (16.3μ) thick and comprised about 65 wt % commercially available ethylene acrylic acid copolymer (DOW Primacor® 3440), about 32 wt % commercially available autoclave-polymerized low density polyethylene (Chevron Marflex® 1017), and about 3 wt % commercially available slip additive masterbatch (PM14598); the third layer was adjacent to the second layer and was about 16 G (4.1μ) thick and comprised about 95 wt % commercially available ethylene acrylic acid copolymer (DOW Primacor® 3440), about 3 wt % commercially available slip additive masterbatch (PM14598), and about 2 wt % commercially available antiblock additive masterbatch (A. Schulman Polybatch® F20).

The resultant overall composite film of comparative example 4 was about 152 G (38.6μ) thick. This composite structure did not have enough hot tack strength to survive the cooking and reheating operations, even though the hot tack would have been sufficient for packaging.

The following Table 1 provides the composition of the films on a layer by layer basis of the examples.)

TABLE 1

| | Extrusion Coating | | | Base (Substrate) | | Extrusion Coating | | |
|---|---|---|---|---|---|---|---|---|
| | Layer 3 | Layer 2 | Layer 1 | Primer | Film | Primer | Layer 1 | Layer 2 | Layer 3 |
| Example 1 | 15 G (3.8μ) 89 wt % Total M3766 10 wt % Tafmer® XM7070 1 wt % ABVT19NSC | 50 G (12.7μ) 70 wt % Total M3766 30 wt % DOW LDPE 722 | 0.01 lb/ream MICA A-131-X | 92 G (23μ) PA10 | 0.01 lb/ream MICA A-131-X | 28 G (7.1μ) 70 wt % Total M3766 30 wt % DOW LDPE 722 | 50 G (12.7μ) 70 wt % Total M3766 30 wt % DOW LDPE 722 | 15 G (3.8μ) 89 wt % Total M3766 10 wt % Tafmer® XM7070 1 wt % ABVT19NSC |
| Example 2 | | | | 150 G (38.1μ) TXHC14 | 0.01 lb/ream MICA A-131-X | 30 G (7.6μ) 70 wt % Total M3766 30 wt % DOW LDPE 722 | 54 G (13.7μ) 70 wt % Total M3766 30 wt % DOW LDPE 722 | 16 G (4.1μ) 89 wt % Total M3766 10 wt % Tafmer® XM7070 1 wt % ABVT19NSC |
| Example 3 | 13 G (3.3μ) 100 wt % Total M3766 | 44 G (11.2μ) 70 wt % Total M3766 30 wt % DOW LDPE 722 | 0.01 lb/ream MICA A-131-X | 92 G (23μ) PA10 | 0.01 lb/ream MICA A-131-X | 29 G (7.4μ) 70 wt % Total M3766 30 wt % DOW LDPE 722 | 56 G (15.2μ) 70 wt % Total M3766 30 wt % DOW LDPE 722 | 16 G (4.1μ) 81 wt % Total M3766 18 wt % Tafmer® XM7070 1 wt % ABVT19NSC |

The following Table 2 provides the composition of the films on a layer by layer basis of the comparative examples.

TABLE 2

| | Extrusion Coating | | | Base (Substrate) | | Extrusion Coating | | |
|---|---|---|---|---|---|---|---|---|
| | Layer 3 | Layer 2 | Layer 1 | Primer | Film | Primer | Layer 1 | Layer 2 | Layer 3 |
| Comparative Example 1 | | 10.4 G (2.6μ) 95.5 wt % Dowlex® 3010 3 wt % PM14598 1.5 wt % Polybatch F20 | 44.3 G (11.3μ) 95 wt % Dowlex® 3010 3 wt % PM14598 2 wt % Polybatch F20 | 0.01 lb/ream MICA A-131-X | 200 G (50μ) PA66 | 0.01 lb/ream MICA A-131-X | 44.3 G (11.3μ) 95 wt % Dowlex® 3010 3 wt % PM14598 2 wt % Polybatch® F20 | 10.4 G (2.6μ) 95.5 wt % Dowlex® 3010 3 wt % PM14598 1.5 wt % Polybatch F20 | |
| Comparative Example 2 | 16 G (4.1μ) 88 wt % Total M3766 10 wt % Tafmer® XM7070 2 wt % ABVT19NSC | 64 G (16.3μ) 70 wt % Total M3766 30 wt % DOW LDPE 722 | 40 G (10.2μ) 80 wt % Affinity® PT 1450G1 20 wt % DOW LDPE 722 | 0.01 lb/ream MICA H-760-A | 200 G (50μ) PA66 | 0.01 lb/ream MICA H-760-A | 40 G (10.2μ) 80 wt % Affinity® PT 1450G1 20 wt % DOW LDPE 722 | 64 G (16.3μ) 70 wt % Total M3766 30 wt % DOW LDPE 722 | 16 G (4.1μ) 88 wt % Total M3766 10 wt % Tafmer® XM7070 2 wt % ABVT19NSC |
| Comparative Example 3 | 15.5 G (3.9μ) 80 wt % Elite® 5815 16 wt % DOW LDPE 722 4 wt % Polybatch® F20 | 49.7 G (12.6μ) 80 wt % Elite® 5815 20 wt % DOW LDPE 722 | 38.8 G (9.9μ) 100 wt % DOW LDPE 722 | 0.01 lb/ream MICA A-131-X | 92 G (23μ) PA10 | 0.01 lb/ream MICA A-131-X | 38.8 G (9.9μ) 100 wt % DOW LDPE 722 | 49.7 G (12.6μ) 80 wt % Elite® 5815 20 wt % DOW LDPE 722 | 15.5 G (3.9μ) 80 wt % Elite® 5815 16 wt % DOW LDPE 722 4 wt % Polybatch® F20 |
| Comparative Example 4 | 16 G (4.1μ) 95 wt % Primacor® 3440 3 wt % PM14598 2 wt % Polybatch® F20 | 64 G (16.3μ) 65 wt % Primacor® 3440 32 wt % Marflex® 1017 3 wt % PM14598 | 24.4 G (6.2μ) 100 wt % Marflex® 1017 | 0.01 lb/ream MICA A-131-X | 92 G (23μ) PA10 | | | | |

The following Table 3 provides the test results of the examples and comparative examples.

TABLE 3

| | Peak Hot Tack Strength [g/in] ASTM F1921 Method B | Peak Hot Tack Temperature [°F.] ASTM F1921 Method B | Hot Tack Strength at 300° F. [g/in] ASTM F1921 Method B | COF Sealant to Sealant Toray Method** | COF Sealant to Stainless Steel Toray Method** | Young's Modulus (MD/TD) [kpsi] ASTM D882 | Packaging Result |
|---|---|---|---|---|---|---|---|
| Example 1 | 498 | 310 | 366 | Static: 0.64 Dynamic: 0.53 | Static: 0.40 Dynamic: 0.37 | Machine Direction: 318 Transverse Direction: 344 | Satisfactory performance in hot and cold fill, and with various cooking and reheating methods |
| Example 2 | 347 | 310 | 316 | Static: 0.63 Dynamic: 0.53 | Static: 0.39 Dynamic: 0.37 | Machine Direction: 168 Transverse Direction: 211 | Satisfactory performance in hot and cold fill, and with various cooking and reheating methods |

TABLE 3-continued

| | Peak Hot Tack Strength [g/in] ASTM F1921 Method B | Peak Hot Tack Temperature [° F.] ASTM F1921 Method B | Hot Tack Strength at 300° F. [g/in] ASTM F1921 Method B | COF Sealant to Sealant Toray Method** | COF Sealant to Stainless Steel Toray Method** | Young's Modulus (MD/TD) [kpsi] ASTM D882 | Packaging Result |
|---|---|---|---|---|---|---|---|
| Comparative Example 2 | 480 | 320 | 63 | Static: 0.74 Dynamic: 0.62 | Static: 0.37 Dynamic: 0.35 | | Insufficient hermeticity to contain a high liquid content food |
| Comparative Example 3 | 293 | 280 | 276 | Static: 0.09 Dynamic: 0.08 | Static: 0.98 Dynamic: 0.97 | | Insufficient hot tack, especially when sealing through contamination |
| Comparative Example 4 | 564 | 240 | 173 | Static: 0.33 Dynamic: 0.33 | Static: 0.30 Dynamic: 0.30 | | Insufficient hot tack at higher temperatures needed for cooking and reheating processes |

**The Toray Method for COF Testing is similar in procedure to ASTM D1894, except in that a four pound (1814 g) sled is used, and three specimens are tested.

FIG. 11 shows the hot tack strength of some examples and comparative examples of film as tested according to ASTM F-1921 method B with a 0.0 s cool delay at a variety of temperatures.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A film comprising:
   a heat stable layer; and
   a heat sealable layer on a side of the heat stable layer, wherein the heat sealable layer comprises:
      a first heat sealable layer comprising 60-80 wt % metallocene-catalyzed polypropylene and 20-40 wt % low density polyethylene (LDPE);
      a second heat sealable layer on a side of the first heat sealable layer opposite the heat stable layer comprising 60-80 wt % metallocene-catalyzed polypropylene and 20-40 wt % low density polyethylene (LDPE); and
      a third heat sealable layer on a side of the second heat sealable layer opposite the first heat sealable layer comprising 75-95 wt % metallocene-catalyzed polypropylene and 5-25 wt % propylene-butylene copolymer.

2. The film of claim 1, further comprising a lap sealable layer on a side of the heat stable layer opposite the heat sealable layer.

3. The film of claim 2, wherein the lap sealable layer comprises:
   a first lap sealable layer comprising 60-80 wt % metallocene-catalyzed polypropylene and 20-40 wt % LDPE; and
   a second lap sealable layer on a side of the first lap sealable layer opposite the heat stable layer comprising 80-100 wt % metallocene-catalyzed polypropylene and 0-20 wt % propylene-butylene copolymer.

4. The film of claim 3, wherein the second lap sealable layer comprises 80-95 wt % metallocene-catalyzed polypropylene and 5-20 wt % propylene-butylene copolymer.

5. The film of claim 3, wherein the second lap sealable layer consists of metallocene-catalyzed polypropylene.

6. The film of claim 1, further comprising a primer layer between the heat stable layer and the heat sealable layer.

7. The film of claim 2, further comprising a primer layer between the heat stable layer and the lap sealable layer.

8. The film of claim 1, wherein the heat stable layer comprises a core layer comprising crystalline PET and a skin layer on a side of the core layer opposite the heat sealable layer comprising amorphous copolyester.

9. The film of claim 1, wherein the heat stable layer comprises a core layer comprising propylene homopolymer and a skin layer on a side of the core layer opposite the heat sealable layer comprising random copolymer of propylene and ethylene.

10. The film of claim 1, wherein the film has a thickness of 200-300 G.

11. The film of claim 1, wherein the film has a peak hot tack strength of at least 250 g/in.

12. The film of claim 1, wherein the film has a peak hot tack temperature of at least 300° F.

13. The film of claim 1, wherein the film has a hot tack strength of at least 200 g/in.

14. The film of claim 1, wherein the film has a static coefficient of friction of sealant to sealant of 0.2-0.9 and a dynamic coefficient of friction of sealant to sealant of 0.1-0.9.

15. The film of claim 1, wherein the film has a Young's Modulus in the machine direction of 70,000-500,000 lb/in$^2$ and a Young's Modulus in the transverse direction of 70,000-500,000 lb/in$^2$.

16. A film comprising:
    a heat stable layer;
    a heat sealable layer on a side of the heat stable layer, wherein the heat sealable layer comprises:
        a first heat sealable layer comprising 60-80 wt % metallocene-catalyzed polypropylene and 20-40 wt % low density polyethylene (LDPE);
        a second heat sealable layer on a side of the first heat sealable layer opposite the heat stable layer comprising 60-80 wt % metallocene-catalyzed polypropylene and 20-40 wt % low density polyethylene (LDPE); and
        a third heat sealable layer on a side of the second heat sealable layer opposite the first heat sealable layer comprising 75-95 wt % metallocene-catalyzed polypropylene and 5-25 wt % propylene-butylene copolymer; and
    a lap sealable layer on a side of the heat stable layer opposite the heat sealable layer, wherein the lap sealable layer comprises:
        a first lap sealable layer comprising 60-80 wt % metallocene-catalyzed polypropylene and 20-40 wt % LDPE; and
        a second lap sealable layer on a side of the first lap sealable layer opposite the heat stable layer comprising 80-100 wt % metallocene-catalyzed polypropylene and 0-20 wt % propylene-butylene copolymer.

17. The film of claim 16, wherein the second lap sealable layer comprises 80-95 wt % metallocene-catalyzed polypropylene and 5-20 wt % propylene-butylene copolymer.

18. The film of claim 16, wherein the second lap sealable layer consists of metallocene-catalyzed polypropylene.

19. The film of claim 16, further comprising a first primer layer between the heat stable layer and the heat sealable layer and a second primer layer between the heat stable layer and the lap sealable layer.

20. The film of claim 16, wherein the heat stable layer comprises a core layer comprising crystalline PET and a skin layer on a side of the core layer opposite the heat sealable layer comprising amorphous copolyester.

21. The film of claim 16, wherein the heat stable layer comprises a core layer comprising propylene homopolymer and a skin layer on a side of the core layer opposite the heat sealable layer comprising random copolymer of propylene and ethylene.

22. The film of claim 16, wherein the film has a thickness of 200-300 G.

23. The film of claim 16, wherein the film has a peak hot tack strength of at least 250 g/in.

24. The film of claim 16, wherein the film has a peak hot tack temperature of at least 300° F.

25. The film of claim 16, wherein the film has a hot tack strength of at least 200 g/in.

26. The film of claim 16, wherein the film has a static coefficient of friction of sealant to sealant of 0.2-0.9 and a dynamic coefficient of friction of sealant to sealant of 0.1-0.9.

27. The film of claim 16, wherein the film has a Young's Modulus in the machine direction of 70,000-500,000 lb/in-land a Young's Modulus in the transverse direction of 70,000-500,000 lb/int.

28. A method of forming a film comprising:
    extruding a heat stable layer; and
    extrusion coating a heat sealable layer on a side of the heat stable layer, wherein the heat sealable layer comprises:
        a first heat sealable layer comprising 60-80 wt % metallocene-catalyzed polypropylene and 20-40 wt % low density polyethylene (LDPE);
        a second heat sealable layer on a side of the first heat sealable layer opposite the heat stable layer comprising 60-80 wt % metallocene-catalyzed polypropylene and 20-40 wt % low density polyethylene (LDPE); and
        a third heat sealable layer on a side of the second heat sealable layer opposite the first heat sealable layer comprising 75-95 wt % metallocene-catalyzed polypropylene and 5-25 wt % propylene-butylene copolymer.

29. The method of claim 28, further comprising extrusion coating a lap sealable layer on a side of the heat stable layer opposite the heat sealable layer.

30. The method of claim 29, wherein the lap sealable layer comprises:
    a first lap sealable layer comprising 60-80 wt % metallocene-catalyzed polypropylene and 20-40 wt % LDPE; and
    a second lap sealable layer on a side of the first lap sealable layer opposite the heat stable layer comprising 80-100 wt % metallocene-catalyzed polypropylene and 0-20 wt % propylene-butylene copolymer.

31. The method of claim 30, wherein the second lap sealable layer comprises 80-95 wt % metallocene-catalyzed polypropylene and 5-20 wt % propylene-butylene copolymer.

32. The method of claim 30, wherein the second lap sealable layer consists of metallocene-catalyzed polypropylene.

33. The method of claim 28, further comprising solution coating a first primer layer on a side of the heat stable layer such that the first primer layer is between the heat stable layer and the heat sealable layer.

34. The method of claim 29, further comprising solution coating a second primer layer on a side of the heat stable layer such that the second primer layer is between the heat stable layer and the lap sealable layer.

35. The method of claim 28, further comprising coextruding a core layer comprising crystalline PET and a skin layer comprising amorphous copolyester to form the heat stable layer.

36. The method of claim 35, wherein the heat sealable layer is extrusion coated on a side of the core layer opposite the skin layer.

37. The method of claim 28, further comprising coextruding a core layer comprising propylene homopolymer and a skin layer comprising random copolymer of propylene and ethylene.

38. The method of claim 35, wherein the heat sealable layer is extrusion coated on a side of the core layer opposite the skin layer.

39. The method of claim 28, wherein the film has a thickness of 200-300 G.

40. The method of claim 28, wherein the film has a peak hot tack strength of at least 250 g/in.

41. The method of claim 28, wherein the film has a peak hot tack temperature of at least 300° F.

42. The method of claim 28, wherein the film has a hot tack strength of at least 200 g/in.

43. The method of claim 28, wherein the film has a static coefficient of friction of sealant to sealant of 0.2-0.9 and a dynamic coefficient of friction of sealant to sealant of 0.1-0.9.

44. The film of claim 1, wherein the film has a Young's Modulus in the machine direction of 70,000-500,000 lb/in$^2$ and a Young's Modulus in the transverse direction of 70,000-500,000 lb/in$^2$.

45. A method of forming a film comprising:
extruding a heat stable layer;
extrusion coating a heat sealable layer on a side of the heat stable layer, wherein the heat sealable layer comprises:
   a first heat sealable layer comprising 60-80 wt % metallocene-catalyzed polypropylene and 20-40 wt % low density polyethylene (LDPE);
   a second heat sealable layer on a side of the first heat sealable layer opposite the heat stable layer comprising 60-80 wt % metallocene-catalyzed polypropylene and 20-40 wt % low density polyethylene (LDPE); and
   a third heat sealable layer on a side of the second heat sealable layer opposite the first heat sealable layer comprising 75-95 wt % metallocene-catalyzed polypropylene and 5-25 wt % propylene-butylene copolymer; and
extrusion coating a lap sealable layer on a side of the heat stable layer opposite the heat sealable layer, wherein the lap sealable layer comprises:
   a first lap sealable layer comprising 60-80 wt % metallocene-catalyzed polypropylene and 20-40 wt % LDPE; and
   a second lap sealable layer on a side of the first lap sealable layer opposite the heat stable layer comprising 80-100 wt % metallocene-catalyzed polypropylene and 0-20 wt % propylene-butylene copolymer.

46. The method of claim 45, wherein the second lap sealable layer comprises 80-95 wt % metallocene-catalyzed polypropylene and 5-20 wt % propylene-butylene copolymer.

47. The method of claim 45, wherein the second lap sealable layer consists of metallocene-catalyzed polypropylene.

48. The method of claim 45, further comprising solution coating a first primer layer on a side of the heat stable layer such that the first primer layer is between the heat stable layer and the heat sealable layer and solution coating a second primer layer on a side of the heat stable layer opposite the first primer layer such that the second primer layer is between the heat stable layer and the lap sealable layer.

49. The method of claim 45, further comprising coextruding a core layer comprising crystalline PET and a skin layer comprising amorphous copolyester to form the heat stable layer.

50. The method of claim 49, wherein the heat sealable layer is extrusion coated on a side of the core layer opposite the skin layer.

51. The method of claim 45, further comprising coextruding a core layer comprising propylene homopolymer and a skin layer comprising random copolymer of propylene and ethylene.

52. The method of claim 51, wherein the heat sealable layer is extrusion coated on a side of the core layer opposite the skin layer.

53. The method of claim 45, wherein the film has a thickness of 200-300 G.

54. The method of claim 45, wherein the film has a peak hot tack strength of at least 250 g/in.

55. The method of claim 45, wherein the film has a peak hot tack temperature of at least 300° F.

56. The method of claim 45, wherein the film has a hot tack strength of at least 200 g/in.

57. The method of claim 45, wherein the film has a static coefficient of friction of sealant to sealant of 0.2-0.9 and a dynamic coefficient of friction of sealant to sealant of 0.1-0.9.

58. The method of claim 45, wherein the film has a Young's Modulus in the machine direction of 70,000-500,000 lb/in$^2$ and a Young's Modulus in the transverse direction of 70,000-500,000 lb/in$^2$.

* * * * *